(12) United States Patent
Doggett et al.

(10) Patent No.: US 10,853,220 B2
(45) Date of Patent: Dec. 1, 2020

(54) DETERMINING USER ENGAGEMENT WITH SOFTWARE APPLICATIONS

(71) Applicant: Microsoft Technology Licensing, LLC, Redmond, WA (US)

(72) Inventors: Chani A. Doggett, Issaquah, WA (US); Brian R. Meyers, Issaquah, WA (US); Colleen E. Hamilton, Bellevue, WA (US); Kiran Tatapudi, Sammamish, WA (US); Michael J. Novak, Redmond, WA (US); Kenneth M. Tubbs, Issaquah, WA (US); Sriram Srinivasan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/590,895

(22) Filed: May 9, 2017

(65) Prior Publication Data
US 2018/0300217 A1    Oct. 18, 2018

Related U.S. Application Data

(60) Provisional application No. 62/484,712, filed on Apr. 12, 2017.

(51) Int. Cl.
*H04L 29/06*      (2006.01)
*G06F 11/34*      (2006.01)
(Continued)

(52) U.S. Cl.
CPC ...... *G06F 11/3438* (2013.01); *G06F 11/3006* (2013.01); *G06F 16/9535* (2019.01); *H04L 67/22* (2013.01); *G06Q 30/02* (2013.01)

(58) Field of Classification Search
CPC .................................................. H04L 67/22
See application file for complete search history.

(56) References Cited

U.S. PATENT DOCUMENTS

| 5,463,774 A | 10/1995 | Jenness |
| 5,943,496 A | 8/1999 | Li et al. |
| (Continued) | | |

FOREIGN PATENT DOCUMENTS

| EP | 1155366 A1 | 11/2001 |
| EP | 2608041 A1 | 6/2013 |
| (Continued) | | |

OTHER PUBLICATIONS

"Add Rich Card Attachments to Messages", Retrieved from https://docs.microsoft.com/en-us/azure/bot-service/nodejs/bot-builder-nodejs-send-rich-cards?view=azure-bot-service-3.0, Jun. 6, 2017, 8 Pages.

(Continued)

*Primary Examiner* — Adnan M Mirza
(74) *Attorney, Agent, or Firm* — Alleman Hall Creasman & Tuttle LLP

(57) ABSTRACT

Technology related to determining a user engagement with software programs is disclosed. In one example of the disclosed technology, a method can include receiving a plurality of signals indicating states of the computer and a software application executing on the computer. The method can include combining the signals to determine a user engagement with the software application. The method can include storing a user engagement log based on the determined user engagement with the software application.

16 Claims, 13 Drawing Sheets

(51) Int. Cl.
   *G06F 11/30*      (2006.01)
   *H04L 29/08*      (2006.01)
   *G06F 16/9535*    (2019.01)
   *G06Q 30/02*      (2012.01)

(56) References Cited

U.S. PATENT DOCUMENTS

| | | |
|---|---|---|
| 6,018,743 A | 1/2000 | Xu |
| 6,044,374 A | 3/2000 | Nesamoney et al. |
| 6,085,205 A | 7/2000 | Peairs et al. |
| 6,093,216 A | 7/2000 | Adl-Tabatabai et al. |
| 6,253,252 B1 | 6/2001 | Schofield |
| 6,697,877 B1 | 2/2004 | Martin et al. |
| 6,772,216 B1 | 8/2004 | Ankireddipally et al. |
| 6,826,760 B1 | 11/2004 | Hunt et al. |
| 6,957,395 B1 | 10/2005 | Jobs et al. |
| 6,993,723 B1 | 1/2006 | Danielsen et al. |
| 7,051,042 B2 | 5/2006 | Krishnaprasad et al. |
| 7,802,205 B2 | 9/2010 | Bedingfield |
| 7,970,240 B1 | 6/2011 | Chao et al. |
| 8,020,111 B2 | 9/2011 | Horvitz et al. |
| 8,037,046 B2 | 10/2011 | Udezue et al. |
| 8,065,732 B1 | 11/2011 | Ward et al. |
| 8,353,012 B2 | 1/2013 | Del Real |
| 8,364,514 B2 | 1/2013 | Macbeth et al. |
| 8,612,435 B2 | 12/2013 | Sambrani et al. |
| 8,782,218 B1 | 7/2014 | Graham et al. |
| 8,789,014 B2 | 7/2014 | Robison et al. |
| 9,054,919 B2 | 6/2015 | Kiang et al. |
| 9,100,337 B1 | 8/2015 | Baftre et al. |
| 9,125,015 B2 | 9/2015 | Pennanen et al. |
| 9,191,355 B2 | 11/2015 | Yerli |
| 9,230,027 B2 | 1/2016 | Greene |
| 9,288,175 B2 | 3/2016 | Eisenberg et al. |
| 9,317,390 B2 | 4/2016 | Chisa et al. |
| 9,342,209 B1 | 5/2016 | Hwang et al. |
| 9,363,634 B1 | 6/2016 | Kirmse et al. |
| 9,720,888 B1 | 8/2017 | Jain et al. |
| 9,779,063 B1 | 10/2017 | Dykema |
| 9,824,363 B1 | 11/2017 | Wang et al. |
| 10,025,702 B1 | 7/2018 | Karppanen |
| 2002/0174134 A1 | 11/2002 | Goykhman |
| 2004/0103426 A1 | 5/2004 | Ludvig et al. |
| 2004/0133848 A1 | 7/2004 | Hunt et al. |
| 2004/0193616 A1 | 9/2004 | Pharies et al. |
| 2004/0220946 A1 | 11/2004 | Krishnaprasad et al. |
| 2005/0044089 A1 | 2/2005 | Wu et al. |
| 2005/0102675 A1 | 5/2005 | Parkyn |
| 2005/0234986 A1 | 10/2005 | Terek et al. |
| 2005/0235206 A1 | 10/2005 | Arend et al. |
| 2006/0004705 A1 | 1/2006 | Horvitz et al. |
| 2006/0036935 A1 | 2/2006 | Warner et al. |
| 2006/0074732 A1 | 4/2006 | Shukla et al. |
| 2006/0155723 A1 | 7/2006 | Kumar et al. |
| 2006/0190440 A1 | 8/2006 | Horvitz et al. |
| 2006/0224583 A1 | 10/2006 | Fikes et al. |
| 2006/0288041 A1 | 12/2006 | Plastina et al. |
| 2007/0016553 A1 | 1/2007 | Dumais et al. |
| 2007/0143123 A1 | 6/2007 | Goldberg et al. |
| 2007/0211871 A1 | 9/2007 | Sjolander et al. |
| 2007/0297590 A1 | 12/2007 | Macbeth et al. |
| 2007/0299631 A1 | 12/2007 | Macbeth et al. |
| 2007/0299795 A1 | 12/2007 | Macbeth et al. |
| 2007/0299796 A1 | 12/2007 | Macbeth et al. |
| 2007/0300174 A1 | 12/2007 | Macbeth et al. |
| 2008/0046218 A1 | 2/2008 | Dontcheva et al. |
| 2008/0049714 A1 | 2/2008 | Commarford et al. |
| 2008/0127108 A1 | 5/2008 | Ivanov et al. |
| 2008/0127109 A1 | 5/2008 | Simeon |
| 2008/0133287 A1 | 6/2008 | Slattery |
| 2008/0276179 A1 | 11/2008 | Borenstein et al. |
| 2008/0295003 A1 | 11/2008 | Behl |
| 2008/0300055 A1* | 12/2008 | Lutnick .............. G07F 17/3209 463/39 |
| 2008/0313227 A1 | 12/2008 | Shafton et al. |
| 2009/0043646 A1 | 2/2009 | Pingali et al. |
| 2009/0150423 A1 | 6/2009 | Spanton et al. |
| 2009/0172101 A1 | 7/2009 | Arthursson |
| 2009/0228427 A1 | 9/2009 | Friesenhahn et al. |
| 2009/0241048 A1 | 9/2009 | Augustine et al. |
| 2009/0313304 A1 | 12/2009 | Goodger et al. |
| 2009/0319472 A1 | 12/2009 | Jain et al. |
| 2010/0058172 A1 | 3/2010 | Soldan et al. |
| 2010/0070527 A1 | 3/2010 | Chen |
| 2010/0162225 A1 | 6/2010 | Huang et al. |
| 2010/0235306 A1 | 9/2010 | Wagoner |
| 2010/0250322 A1 | 9/2010 | Norwood |
| 2011/0040990 A1 | 2/2011 | Chan et al. |
| 2011/0126050 A1 | 5/2011 | Begole et al. |
| 2011/0173525 A1 | 7/2011 | Mukhopadhyay et al. |
| 2011/0191303 A1 | 8/2011 | Kaufman et al. |
| 2011/0289117 A1 | 11/2011 | Agrawal et al. |
| 2012/0084248 A1 | 4/2012 | Gavrilescu |
| 2012/0109801 A1 | 5/2012 | Clark et al. |
| 2012/0110511 A1 | 5/2012 | Howard |
| 2012/0143923 A1 | 6/2012 | Whitney et al. |
| 2012/0144416 A1 | 6/2012 | Wetzer et al. |
| 2012/0159515 A1 | 6/2012 | Calderon et al. |
| 2012/0159564 A1 | 6/2012 | Spektor et al. |
| 2012/0174120 A1 | 7/2012 | Malkiman et al. |
| 2012/0246344 A1 | 9/2012 | Vargas et al. |
| 2012/0246551 A1 | 9/2012 | Patton et al. |
| 2012/0254100 A1 | 10/2012 | Grokop et al. |
| 2012/0271867 A1 | 10/2012 | Grossman et al. |
| 2012/0272230 A1 | 10/2012 | Lee |
| 2012/0303425 A1 | 11/2012 | Katzin et al. |
| 2012/0311447 A1 | 12/2012 | Chisa et al. |
| 2012/0331408 A1 | 12/2012 | Ainslie et al. |
| 2013/0013560 A1 | 1/2013 | Goldberg et al. |
| 2013/0013642 A1 | 1/2013 | Klein et al. |
| 2013/0013689 A1 | 1/2013 | Crawford |
| 2013/0067346 A1 | 3/2013 | Rosenstein et al. |
| 2013/0073389 A1 | 3/2013 | Heath |
| 2013/0080266 A1 | 3/2013 | Molyneux et al. |
| 2013/0080641 A1 | 3/2013 | Lui et al. |
| 2013/0103699 A1 | 4/2013 | Perantatos et al. |
| 2013/0110623 A1 | 5/2013 | Kilroy et al. |
| 2013/0110894 A1 | 5/2013 | Beaverson et al. |
| 2013/0139113 A1 | 5/2013 | Choudhary et al. |
| 2013/0262439 A1 | 10/2013 | Hao et al. |
| 2013/0263289 A1 | 10/2013 | Vijayan et al. |
| 2013/0275509 A1 | 10/2013 | Micucci et al. |
| 2013/0275994 A1 | 10/2013 | Uola et al. |
| 2013/0346482 A1 | 12/2013 | Holmes |
| 2013/0347078 A1 | 12/2013 | Agarwal et al. |
| 2014/0012574 A1 | 1/2014 | Pasupalak et al. |
| 2014/0033291 A1 | 1/2014 | Liu |
| 2014/0068443 A1 | 3/2014 | Eng et al. |
| 2014/0089512 A1 | 3/2014 | Zhao et al. |
| 2014/0095624 A1 | 4/2014 | Quan |
| 2014/0098127 A1 | 4/2014 | Fein et al. |
| 2014/0108585 A1 | 4/2014 | Barton et al. |
| 2014/0122697 A1 | 5/2014 | Liu et al. |
| 2014/0162793 A1 | 6/2014 | Quan et al. |
| 2014/0207730 A1 | 7/2014 | Spataro et al. |
| 2014/0207962 A1 | 7/2014 | Makofsky |
| 2014/0229391 A1 | 8/2014 | East et al. |
| 2014/0229462 A1 | 8/2014 | Lo |
| 2014/0325070 A1 | 10/2014 | Philip et al. |
| 2014/0337339 A1 | 11/2014 | Li |
| 2015/0004998 A1 | 1/2015 | Pennanen et al. |
| 2015/0081633 A1 | 3/2015 | Su et al. |
| 2015/0128162 A1 | 5/2015 | Ionescu |
| 2015/0163530 A1 | 6/2015 | Bayer et al. |
| 2015/0235258 A1 | 8/2015 | Shah et al. |
| 2015/0235275 A1 | 8/2015 | Shah et al. |
| 2015/0256423 A1 | 9/2015 | Stearns |
| 2015/0286694 A1 | 10/2015 | Kaplinger et al. |
| 2015/0294634 A1 | 10/2015 | Jung et al. |
| 2015/0295808 A1 | 10/2015 | O'Malley et al. |
| 2015/0339374 A1 | 11/2015 | Smarr et al. |
| 2015/0350106 A1 | 12/2015 | Whalley et al. |
| 2015/0365453 A1 | 12/2015 | Cheng |
| 2015/0370765 A1 | 12/2015 | Kim et al. |

(56) References Cited

U.S. PATENT DOCUMENTS

| | | | |
|---|---|---|---|
| 2016/0026611 | A1 | 1/2016 | Liu et al. |
| 2016/0092107 | A1 | 3/2016 | Bruner et al. |
| 2016/0110313 | A1 | 4/2016 | Prakash et al. |
| 2016/0162370 | A1 | 6/2016 | Mehta et al. |
| 2016/0239896 | A1 | 8/2016 | Chay |
| 2016/0261709 | A1 | 9/2016 | Sacks et al. |
| 2016/0294916 | A1 | 10/2016 | Daher et al. |
| 2016/0296798 | A1 | 10/2016 | Balakrishnan et al. |
| 2016/0302166 | A1 | 10/2016 | Dang et al. |
| 2016/0352846 | A9 | 12/2016 | Gauglitz et al. |
| 2017/0017638 | A1 | 1/2017 | Satyavarta et al. |
| 2017/0094635 | A1 | 3/2017 | Liu et al. |
| 2017/0169403 | A1 | 6/2017 | Zhang |
| 2017/0222865 | A1 | 8/2017 | Koorapati et al. |
| 2017/0293893 | A1 | 10/2017 | Pierce et al. |
| 2017/0336960 | A1 | 11/2017 | Chaudhri et al. |
| 2018/0246937 | A1 | 8/2018 | Alphin et al. |
| 2018/0309804 | A1 | 10/2018 | Nagy et al. |
| 2019/0020673 | A1 | 1/2019 | Weinstein et al. |
| 2019/0050378 | A1 | 2/2019 | Novak et al. |
| 2019/0050440 | A1 | 2/2019 | Novak et al. |

FOREIGN PATENT DOCUMENTS

| | | |
|---|---|---|
| EP | 2851857 A1 | 3/2015 |
| WO | 2005072191 A2 | 8/2005 |
| WO | 2008021478 A2 | 2/2008 |
| WO | WO 20130192564 | 12/2013 |
| WO | 2014102698 A1 | 7/2014 |

OTHER PUBLICATIONS

"Applet", Retrieved from https://en.wikipedia.org/wiki/Applet :, Retrieved on Nov. 15, 2017, 4 Pages.

"Comparison of Data Serialization Formats", Retrieved from https://en.wikipedia.org/wiki/Comparison_of_data_serialization_formats, Retrieved on Nov. 1, 2017, 11 Pages.

"DataPackage Class", Retrieved from https://docs.microsoft.com/en-us/uwp/api/windows.applicationmodel.datatransfer.datapackage, Retrieved on Nov. 27, 2017, 19 Pages.

"DataPackagePropertySet Class", Retrieved from https://docs.microsoft.com/en-us/uwp/api/windows.applicationmodel.datatransfer.datapackagepropertyset, Retrieved on Nov. 27, 2017, 16 Pages.

"Document File Format", Retrieved from https://en.wikipedia.org/wiki/Document_file_format, Retrieved on Nov. 27, 2017, 3 Pages.

"Hersult", Retrieved from https://en.wikipedia.org/wiki/HRESULT, Retrieved on Nov. 1, 2017, 3 Pages.

"How to: Add Data to the Clipboard", Retrieved from https://docs.microsoft.com/en-us/dotnet/framework/winforms/advanced/how-to-add-data-to-the-clipboard, Mar. 30, 2017, 5 Pages.

"HString Class", Retrieved from https://msdn.microsoft.com/en-us/library/hh771141.aspx, Retrieved on Nov. 10, 2017, 3 Pages.

"JavaScript Tutorial—Adding JavaScript to a page", Retrieved from http://www.howtocreate.co.uk/tutorials/javascript/incorporate, Retrieved on Nov. 15, 2017, 5 Pages.

"JSON", Retrieved from https://en.wikipedia.org/wiki/JSON, Retrieved on Nov. 15, 2017, 13 Pages.

"Metadata", Retrieved from https://en.wikipedia.org/wiki/Metadata, Retrieved on Jul. 31, 2018, 15 Pages.

"Movie", Retrieved from https://schema.org/Movie, Retrieved on Nov. 15, 2017, 10 Pages.

"Observing the Activity of a Device", Retrieved from https://doc.nexthink.com/Documentation/Nexthink/V5.0/UserManual/Observingtheactivityofadevice, Retrieved on Dec. 8, 2016, 5 Pages.

"OEmbed", Retrieved from https://oembed.com/, Retrieved on Nov. 15, 217, 22 Pages.

"Organization of Schemas", Retrieved from https://schema.org/docs/schemas.html, Retrieved on Nov. 10, 2017, 2 Pages.

"Out Attribute", Retrieved from https://docs.microsoft.com/en-us/windows/desktop/Midl/out-idl, Retrieved on Nov. 10, 2017, 3 Pages.

"Propget Attribute", Retrieved from https://docs.microsoft.com/en-us/windows/desktop/Midl/propget, Retrieved on Nov. 10, 2017, 2 Pages.

"Retval Attribute", Retrieved from https://msdn.microsoft.com/en-us/library/windows/desktop/aa367158(v=vs.85).aspx, Feb. 12, 2017, 2 Pages.

"Serialization", Retrieved from https://en.wikipedia.org/wiki/Serialization, Retrieved on Nov. 15, 2017, 9 Pages.

"Standard Clipboard Formats", Retrieved from https://docs.microsoft.com/en-us/windows/desktop/dataxchg/standard-clipboard-formats, Retrieved on Nov. 10, 2017, 5 Pages.

"StandardDataFormats Class", Retrieved from https://docs.microsoft.com/en-us/uwp/api/windows.applicationmodel.datatransfer.standarddataformats#Windows_ApplicationModel_DataTransfer_StandardDataFormats_Texthttps://csstricks.com/dom/, Retrieved on Nov. 15, 2017, 12 Pages.

"Uniform Resource Identifier", Retrieved from: https://en.wikipedia.org/wiki/Uniform_Resource_Identifier :, Retrieved From: Nov. 9, 2017, 9 Pages.

"XML", Retrieved from https://en.wikipedia.org/wiki/XML, Retrieved on Nov. 15, 2107, 15 Pages.

"Non Final Office Action Issued in U.S. Appl. No. 15/825,904", dated Aug. 9, 2018, 42 Pages.

Finley, Kint, "Software Containers Are Bringing the Tech Giants Together", Retrieved from https://www.wired.com/2015/06/software-containers-bringing-tech-giants-together/, Jun. 22, 2015, 3 Pages.

Hogg, Scott, "Software Containers: Used More Frequently than Most Realize", Retrieved from https://www.networkworld.com/article/2226996/cisco-subnet/software-containers--used-more-frequently-than-most-realize.html, May 26, 2014, 4 Pages.

Horvitz, et al., "Learning Predictive Models of Memory Landmarks", In Proceedings of the Annual Meeting of the Cognitive Science Society, vol. 26, Issue 26, Jan. 1, 2004, 6 Pages.

Lardinois, Frederic, "WTF is a container?", Retrieved from https://techcrunch.com/2016/10/16/wtf-is-a-container/, Oct. 17, 2016, 6 Pages.

Paul, Ian, "Top 15 Cloud Storage Tips and Tasks", Retrieved from https://www.pcworld.com/article/255072/top_15_cloud_storage_tips_and_tasks.html, May 6, 2012, 6 Pages.

"International Search Report and Written Opinion Issued in PCT Application No. PCT/US2018/023672", dated Jun. 6, 2018, 13 Pages.

"International Search Report and Written Opinion Issued in PCT Application No. PCT/US18/025775", dated Jul. 9, 2018, 12 Pages.

"International Search Report and Written Opinion Issued in PCT Application No. PCT/US18/025776", dated Jul. 3, 2018, 10 Pages.

"International Search Report & Written Opinion Issued in PCT Application No. PCT/US2018/038386", dated Sep. 5, 2018, 13 Pages.

"International Search Report & Written Opinion Issued in PCT Application No. PCT/US2018/038389", dated Sep. 5, 2018, 12 Pages.

Strassner, Tom, "XML vs JSON", Retrieved from https://www.cs.tufts.edu/comp/150IDS/final_papers/tstras01.1/FinalReport/FinalReport.html, Retrieved on Nov. 15, 2017, 6 Pages.

Chen et al., "Inferring Human Activity in Mobile Devices by Computing Multiple Contexts", *Journal of Sensors*, vol. 15, Issue 9, pp. 21219-21238 (published Aug. 28, 2015).

Kapusta, "Google AdWords Cross-Device Reporting & Attribution", downloaded from http://www.lunametrics.com/blog/2016/11/08/google-adwords-cross-device-reporting-attribution/, 7pp. (document published Nov. 8, 2016, downloaded Jan. 20, 2017).

"Learn How People Use Your App—An App Analytics Tools Round-Up", downloaded from http://web.archive.org/web/20121206012905/http:/www.appta-min.com/blog/app-analytics-tools, 26pp. (document published on Dec. 6, 2012; downloaded on Jan. 20, 2017).

"Tracking the Same Person across Different Devices with Google Analytics", downloaded from http://www.seerinteractive.com/blog/real-cross-device-management/, 9pp. (document published on May 8, 2014, downloaded Dec. 16, 2016).

"Class Object", Retrieved from https://docs.oracle.com/javase/7/docs/api/java/lang/Object.html, Jan. 1993, 10 Pages.

(56) References Cited

OTHER PUBLICATIONS

"In Java, Are Static Class Members Shared Among Programs?", Retrieved from https://stackoverflow.com/questions/686079/in-java-are-static-class-members-shared-among-programs, Retrieved on Aug. 9, 2017, 3 Pages.
"What is ActivTrak? : What Customers Say", Retrieved from https://web.archive.org/web/20170324061743/https://activtrak.com/faq, Mar. 24, 2017, 10 Pages.
Dalorzo, Edwin, "Java Optional Objects", Retrieved from https://dzone.com/articles/java-optional-objects, Apr. 17, 2013 11 Pages.
Frank, et al., "A Hybrid Preference Learning and Context Refinement Architecture.", In Proceedings of Workshop on Intelligent Pervasive Environments, Apr. 9, 2009, 7 Pages.
Kapitza, et al., "Platform-Independent Object Migration in CORBA", In Proceedings of the Confederated international conference on the Move to Meaningful Internet System, Oct. 31, 2005, pp. 900-917.
"International Search Report and Written Opinion Issued in PCT Application No. PCT/US2018/023673", dated May 18, 2018, 12 Pages.
"International Search Report and Written Opinion Issued in PCT Application No. PCT/US2018/018575", dated Apr. 17, 2018, 11 Pages.
Wolff, Franck, "JSON-R: A JSON Extension That Deals With Object References (Circular and Others)", Retrieved from https://dzone.com/articles/json-r-json-extension-deals, Jul. 26, 2013, 6 Pages.
"Non Final Office Action Issued in U.S. Appl. No. 15/590,858", dated Dec. 31, 2018, 15 Pages.
"Non Final Office Action Issued in U.S. Appl. No. 15/442,399", dated Mar. 8, 2019, 15 Pages.
"Notice of Allowance Issued in U.S. Appl. No. 15/442,399", dated Jun. 27, 2019, 11 Pages.
"Final Office Action Issued in U.S. Appl. No. 15/590,858", dated Jun. 5, 2019, 18 Pages.
"Non Final Office Action Issued in U.S. Appl. No. 15/662,057", dated Feb. 26, 2019, 49 Pages.
"Final Office Action Issued in U.S. Appl. No. 15/825,904", dated Feb. 21, 2019, 62 Pages.
"Final Office Action Issued in U.S. Appl. No. 15/662,057", dated Jul. 18, 2019, 59 Pages.
"Non Final Office Action Issued in U.S. Appl. No. 15/590,858", dated Sep. 24, 2019, 19 pages.
"Non Final Office Action Issued in U.S. Appl. No. 15/661,981", dated Sep. 6, 2019, 21 pages.
Cao, et al., "Image Annotation Within the Context of Personal Photo Collections Using Hierarchical Event and Scene Models", In Proceedings of the IEEE Transactions on Multimedia, vol. 11, No..2, Feb. 2009, 12 Pages.
Gemmell, et al., "MylifeBits: A Personal Database for Everything", Microsoft Bay Area Research Center, MSRR-TR 2006-23, Feb. 20, 2006, pp. 1-18.
Mills, et al., "Managing Photos with AT&T Shoebox", In Proceedings of the 23rd Annual International Acm Sigir Conference on Research and Development in Information Retrieval, 2000, 1 Page.
Toyama, et al., "Geographic Location Tags on Digital Images", In Proceedings of the eleventh ACM international, Conference on Multimedia, Nov. 2, 2003, 11 Pages.
"Non Final Office Action Issued in U.S. Appl. No. 15/825,904", dated Oct. 25, 2019, 32 Pages.
"Notice of Allowance Issued in U.S. Appl. No. 15/590,858", dated Feb. 13, 2020, 8 Pages.
"Non Final Office Action Issued in U.S. Appl. No. 15/824,865", dated Mar. 9, 2020, 21 Pages.
"Final Office Action Issued in U.S. Appl. No. 15/825,904", dated Apr. 24, 2020, 34 Pages.
"Office Action Issued in European Patent Application No. 18711439.2", dated Jul. 2, 2020, 7 Pages.
"Final Office Action Issued in U.S. Appl. No. 15/824,865", dated Jun. 30, 2020, 21 Pages.
"Non Final Office Action Issued in U.S. Appl. No. 15/825,904", dated Aug. 19, 2020, 38 Pages.

* cited by examiner

FIG. 2

| StreamID | 202 |
|---|---|
| UserID | 204 |
| DeviceRefs | 206 |
| TaskRefs | 208 |
| ActivityRefs | 210 |

200

| TaskID | 222 |
|---|---|
| TaskTypeID | 224 |
| ActivityRefs | 226 |
| Name | 228 |
| Image | 230 |
| Relevance | 232 |

220

| ActivityID | 242 |
|---|---|
| AppActivityID | 244 |
| ActivationTarget | 246 |
| ContentTarget | 248 |
| Name | 250 |
| Image | 252 |
| Properties | 254 |
| ContentType | 256 |
| ApplicationID | 258 |
| AppDisplayName | 260 |
| AppIcon | 262 |
| Relevance | 264 |
| HistoryRefs | 266 |

240

| Type | 272 |
|---|---|
| ActivityReferenced | 274 |
| EventPeriod | 276 |
| ActiveTime | 278 |
| ReportingSource | 280 |
| DeviceID | 282 |
| DisplayText | 284 |
| ReportTime | 286 |
| LocalRelevance | 288 |

270

DETERMINING USER ENGAGEMENT WITH SOFTWARE APPLICATIONS

CROSS REFERENCE TO RELATED APPLICATIONS

This application claims the benefit of U.S. Provisional Application Ser. No. 62/484,712, entitled DETERMINING USER ENGAGEMENT WITH SOFTWARE APPLICATIONS, filed on Apr. 12, 2017, which is incorporated by reference herein.

BACKGROUND

As computer functionality becomes more powerful and drops in price, users may perform more tasks on a given computing device and each user may use multiple computing devices. For example, a user may use one or more computing devices in a given day to perform activities such as watching videos, listening to music, browsing the web, using an instant messaging or communication program, working on a document or presentation, or playing a game. The user can switch between different activities and/or perform multiple activities concurrently. For example, one computer-based activity can be interrupted as the user moves between different locations or performs a higher priority task. A user's experience can potentially be more positive and/or the user's productivity can potentially be increased if the computing device can track activities performed by the user and/or assist the user in returning to an activity that was interrupted before the activity was completed.

SUMMARY

Technology related to determining a user engagement with software programs is disclosed. In one example of the disclosed technology, a method can include receiving a plurality of signals indicating states of the computer and a software application executing on the computer. The method can include combining the signals to determine a user engagement with the software application. The method can include storing a user engagement log based on the determined user engagement with the software application.

BRIEF DESCRIPTION OF THE DRAWINGS

FIG. 2 illustrates examples of various data structures for recording the user engagement.

DETAILED DESCRIPTION

General Considerations

Figure 1:
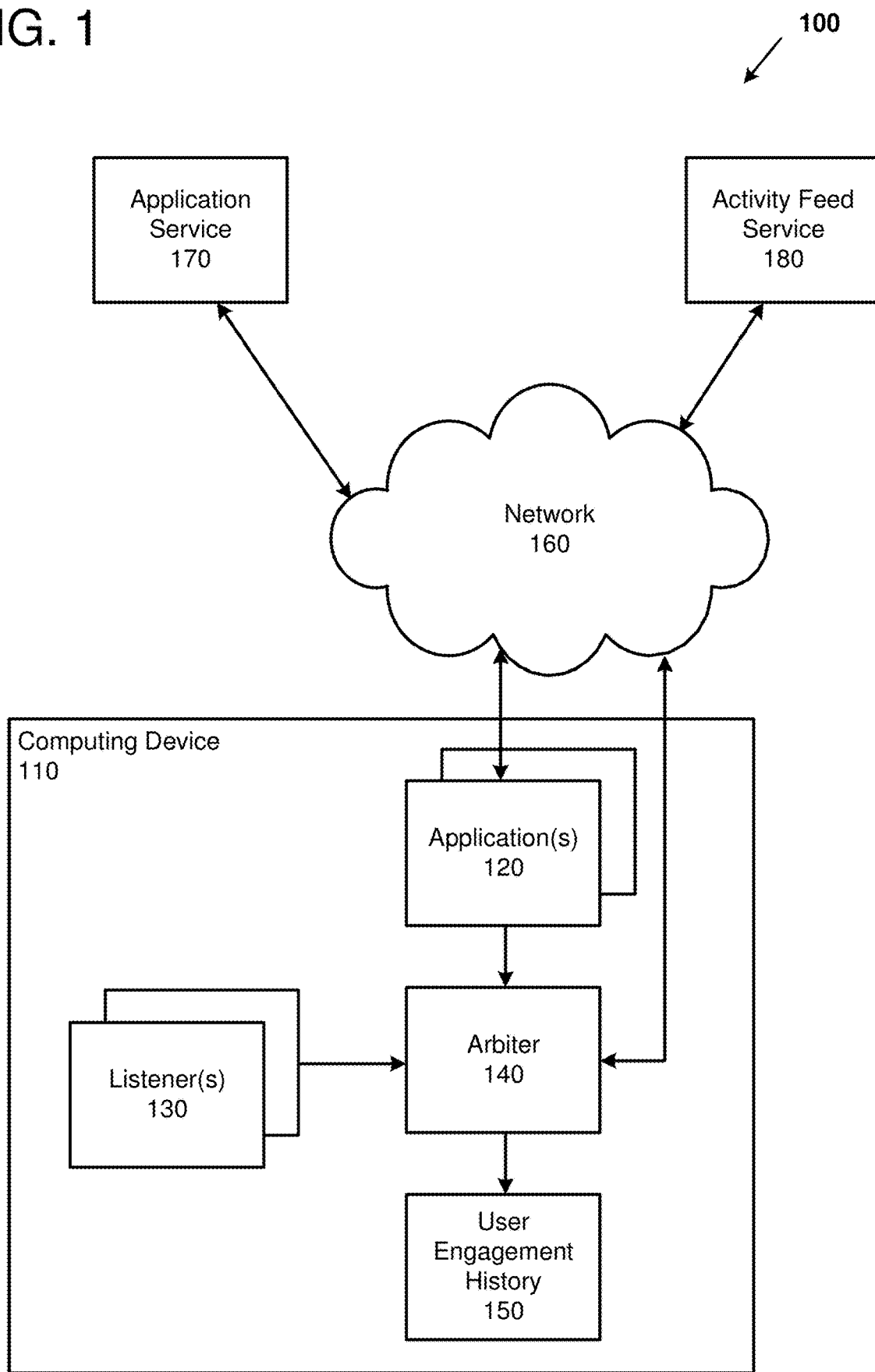
FIG. 1 is a system diagram of an example system for determining a user engagement with one or more software applications.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Overview

As described above, a user may use one or more computing devices in a given day to perform various activities on his or her computing devices. For example, the user can switch between different activities and/or perform multiple activities concurrently. A user's experience can potentially be more positive and/or the user's productivity can potentially be increased if the computing device can track activities performed by the user and/or assist the user in returning to an activity that was being performed at an earlier time.

In some cases, an individual application running on the computing device or an operating system of the computing device, may provide some limited functionality allowing a user to try and trace their activity. As one example, an operating system component may allow the user to view a list of recently created or modified files. As another example, a web browser may allow a user to access a history of web pages visited by the user. However, some usage information may not be available to the user. For example, the user's interaction with some applications may not be captured at all, and content-related information within an application may not be captured. Even when information is available, the specific information for which the user is interested may be intermixed with voluminous amounts of other information. For example, a particular web page that a user is searching for may be buried within information showing many other web pages the user has recently visited. Additionally, even if some search capabilities are provided on a device, the user may desire to review or continue his or her activities on a different device. For example, while a user's desktop computer may hold records of documents accessed by the user, or websites visited by the user, the records are typically not available to the user on another computing device, such as a mobile computing device. Additionally, relationships between different applications are not captured by an application that merely records a history of a user's interaction within the application.

As described herein, a user engagement with software applications executing on a computing device can be tracked so that a more complete view of user activity can be determined across time and devices. As one example, a component of an operating system or other application can receive multiple signals indicating different states of the computing device and software applications executing on the computing device. The signals indicating the different states of the computing device can include signals identifying: which application window is in a focus of the various input devices, an activity of a user input device, a position of a window displaying an output of an application, a state of a window displaying an output of an application, which windows are generating non-visual outputs (such as audio playback), a cursor position, or a detected eye position of the user. The signals indicating the states of the software application can be content-specific to the applications, such as a position within a document, a record being accessed, a level of a game, a time-stamp within a video, an activity occurring within the application, and so forth. The signals can be combined to determine a user engagement with the software applications executing on the computing device. For example, the signals can be combined to form a record of how the application is being used, any artifacts that the application may be acting on, and the type and extent of an interaction with the application. The records can be combined into an activity stream (e.g., a user engagement log) representing a history of user engagement with the software applications. In particular, the information stored within the records of the activity stream can be processed (e.g., smoothed) using a heuristic or other method so that the activity stream can match a user mental model of how the applications on the computing device are being used. Additionally, signals from network-accessible (e.g., cloud) services can be matched up with local services executing on the local computing device based on heuristics or other methods to potentially improve the picture of user activity when the content comes from a software service external to the device.

The user activity stream that is produced as a result of this processing can be used to facilitate further user activity, such as resuming an activity started earlier on the same device or on a different device. Specifically, the user can select a record of the activity stream and the operating system can return the application to the state corresponding to the record of the activity stream. By allowing a user to continue the prior activity, a human-computer interface of the computing device can potentially be improved and energy consumption of the computing device can potentially be reduced since the prior activity can be resumed with fewer steps than if the user manually resumed the application. Additionally, the activity stream can be used to search for activities that occurred on the same device or a different computing device. The activity stream can include activities associated with multiple different software applications. Thus, the activity stream can potentially capture a more complete view of how the user was using the computing device as compared to a single application tracking activity within the application.

In another aspect of the disclosed technology, an activity feed service can communicate with one or more client devices connected over a network, such as the Internet. The activity feed service can receive updates to activity streams, where a respective activity stream indicates an engagement of a respective user with applications executing on a respective client device connected to the network. The activity feed service can merge different activity streams associated with a particular user to generate a merged activity stream associated with the particular user. Thus, the merged activity stream associated with the particular user can include activities of the user across multiple devices. Merging the activity streams can include resolving any conflicting changes to activity within or among the activity streams. The activity feed service can transmit the merged activity stream associated with the particular user to the client devices of the user. In this manner, the activity feed service can assist the user in seeing and acting upon a complete picture of his or her digital activity. Specifically, the user can access a history of engagement and/or resume a given activity of an application across devices and platforms. As used herein, a platform can refer to a type of device or operating environment (such as Windows-based, Linux-based, android-based, or iOS-based devices, for example). The platforms can include traditional computing devices (such as desktops, laptops, mobile devices) and non-traditional computing devices (such as wearable devices, watches, automobiles, Internet of Things devices, and so forth)

The merged activity stream can be used to summarize a history of engagement for consumption by the user and can also be used to track usage metrics that allow an operating system component and/or the activity feed service to determine what the user spent the most time on or where they spent time on multiple things together. The data of the merged activity stream can be independently searchable by history (e.g., time periods) and activities so that the user can be presented with the most relevant activities in a day and/or a relevant grouping of activities, for example. The relevance of activities can be contextual. For example, the currently relevant activity can be based on other activities that are currently executing on the computing device, the current time of day, the proximity of a deadline recorded in a calendar program, or a set of currently entered search terms. As a specific example, searching for tax information can make resuming a tax preparation activity a relevant activity. The merged activity stream can include metadata associated with the activities to allow for topic recognition. The merged activity stream can include metadata about location and other contexts to provide additional information. For example, activities performed in an automobile may be interpreted differently than at a desktop computer. As another example, location information from a cell phone or a watch, or a type of music being listened to can add additional context.

Specifically, the merged activity stream can be generated so that discrete engagement occurrences (on one device or different devices) are grouped to show the user a single relevant activity, and smaller discrete engagement occurrences which happen close together can be grouped into a single relevant activity. The information within the merged activity stream can be analyzed to: identify and show a relevance of activities in a time period based on the user's engagement over time; identify related activities and summarize the user's time as an aggregate of those activities; identify a depth of engagement (e.g., long, short, deep, shallow, and so forth) with activities and use the identified depth as metadata describing the user's time; identify activities that occur after interacting (e.g., emailing or instant messaging) with a particular person; and identify and proactively suggest highly relevant or the most relevant activities for a device, a day or time period, a get-together, a location, an application, a topic, and so forth. A user interface of the activity feed service or on the client device can provide tools for the user to view and augment the merged activity stream. Specifically, the user interface can provide a tool for switching between different types of views of the activity stream, where one view can present a smaller number of high-relevance activities and another view can present a more detailed or fine-grained journaling-style view of the activities. The user interface can provide a tool for grouping and labelling activities based on different parameters, such as by time, content, application, device, topic, duration, and collaborators. The grouped activities can be annotated with metadata so that the merged activity stream can be searched to identify the most relevant activities for each of the different parameters. The user interface can provide a tool for enabling users to specify which activities are most relevant to them, and giving these relevant items special names and/or other attributes to distinguish them when searching for or resuming activities of the merged activity stream. The relevance of a particular activity can be context-dependent and/or can shift over time. The user interface can provide a tool for the user to switch between different systems for defining the relevance of an activity, or the activity feed service or the client device can automatically detect a change in relevance based on a device state and/or a state of the applications executing on the device. The user interface can summarize and present the activities based on the relevance of the activities. Additionally, the activity feed service or the client device can send notifications when content associated with a user's most relevant activities have changed in some way while the user was performing a different activity or while the user was idle. Thus, the user can be alerted to changes in relevant content and the user can take additional action, such as reengaging with the activity.

Example Architectures for Determining a User Engagement

FIG. 1 is a system diagram of an example system 100 for determining a user engagement with one or more software applications. The system 100 can include a computing device 110 that includes computer hardware (e.g., a processor and memory) and software for executing an operating system (not shown) and one or more application(s) 120, such as a web browser, a word processing program, an email program, or a music player. The computing device 110 can communicate with an application service 170 and/or an activity feed service 180 over a network 160.

The system 100 can be used to capture an activity stream associated with the user of the computing device 110. The activity stream can include records of the user's activity within the different applications 120. The records can be generated based on a number of signals coming from the applications 120 and/or listeners 130. For example, the applications 120 can generate signals representing a state of a given application, such as content (e.g., a document or a uniform resource locator (URL)) used within the application, a user action within the application, or other conditions of the application. Additionally, the applications 120 can generate tokens that can be used to enable the application to be restored to a state when the tokens were generated. For example, a token can encode a parameter value or other key that can be used as part of a launch command for the application that will return the application to a state that is represented by the parameter value or key. The tokens can be used to represent information such as a URL, a document name, a location within a document, a time-stamp within a video or audio-track, and so forth. The listeners 130 can generate signals representing a state of the computing device 110, such as activity of an input device, a power state of the computing device 110, a focus of a shell window, and other states of the software and/or hardware of the computing device 110. As one example, the listeners 130 can be threads or processes of an operating system and the listeners 130 can monitor various states of the operating system.

The signals from the listeners 130 and the applications 120 can be received by an arbiter component 140 which can process (e.g., combine) the multiple signals from the listeners 130 and the applications 120 to produce an activity stream for the user. A given activity stream can include one or more records associated with one or more activities. A data structure for a given activity includes a pairing of an application with content. For example, an activity can represent a word processing program with a specific document loaded, a video application program with a specific video loaded, or game with a specific level loaded. The data structure for the given activity can include additional information about the user, the application, and/or the content. For example, the data structure for the given activity can include a token generated by the application to resume the application at a state when the token was generated. As another example, the data structure for the given activity can include history records (also referred to as engagement records) that keep a history of user engagement with the activity. The history records can track a period of time the user was directly engaged with the activity and landmark events like printing, sharing, bookmarking, or completing an activity. The arbiter 140 can generate the history records based on the signals received from the listeners 130 and the applications 120. Thus, a given activity stream can include information about which activities a user has engaged in, and a history and/or duration of the activities.

The activity stream can be stored locally and/or transmitted to the activity feed service 180. For example, the activity stream can be used to generate a user engagement history 150 that can be stored on the computing device 110. As another example, the activity stream can be transmitted to the activity feed service 180 for storage and/or for additional processing. The activity feed service 180 can merge a given activity stream associated with a particular device (such as the computing device 110) with another activity stream associated with a different device (not shown). Thus, the activities for a given user that are performed on different devices (such as a work computer, a home computer, a mobile computing device, or game console) can be combined into a merged activity stream. Additionally, the activity feed service 180 can annotate, disambiguate, and/or merge activity records from different devices and/or by using information received from an application service 170. For example, the application service 170 can work in coordination with the applications 120 (e.g., the application service 170 can back an application) and the application service 170 can provide information about the activity. The application service 170 can provide the information to the computing device 110 (e.g., the applications 120 and/or the arbiter 140) and/or to the activity feed service 180.

The arbiter 140 can process an activity stream based on the signals generated by the applications 120, the listeners 130, information received from the application service 170, and information received from the activity feed service 180. For example, the arbiter 140 can merge activity records and/or history records within an activity stream. As a specific example, pauses in an activity can be eliminated by combining history records on either side of the pause. As another example, the arbiter 140 can annotate the activity stream with additional information from the application service 170 or the activity feed service 180. As another example, the arbiter 140 can serve as an access point to the activity streams so that the activity streams can be edited, searched, and/or used for resuming earlier activities. The activity streams can be edited by pruning less important information from the activity streams and by organizing the activities into tasks. A task is a collection of references to zero or more activities. An activity can be referred to by multiple tasks. Tasks can be created at the request of the user via a user interface (not shown) that communicates with the arbiter 140. Additionally or alternatively, tasks can be inferred by the arbiter 140 based on a correlation between different activities. The tasks can be used as a search criteria of the activity stream and/or to resume multiple activities using a single reference.

FIG. 2 illustrates examples of various data structures for recording the user engagement within an activity stream. The activity stream can be used to represent the user's engagement with one or more software applications on one or more computing devices over a period of time. An activity stream data structure can be a fully or partially hierarchical collection of task records, activity records, and history records. As one example, task records can be at a higher level of the hierarchy than activity records which can be at a higher level of the hierarchy than the history records. Thus, a given task record can reference zero or more activity records and a given activity record can reference zero or more history records. The activity stream data structure can include references to individual task records and/or to individual activity records that represent the user engagement with the applications for the devices and time period covered by the activity stream. As another example, the activity stream data structure can be a collection of history records, where the respective history records identify one or more activities and/or tasks associated with the history record. Thus, a single type of record can be used to identify history, tasks, and activities. As another example, the activity stream data structure can be a collection of activity and history records, where the respective activity records identify one or more tasks associated with the activity record, and the activity record references history records associated with the activity.

By maintaining multiple data structures and/or by organizing the records in different ways, the activity streams can be processed more or less efficiently when performing different functions on the activity stream data. For example, using activities as the primary records, where history records are referenced by the activities, can make it more efficient to present information associated with a user's activities. As a specific example, a primary record can include an activity (e.g., watching a specific video) and the engagement or history records (e.g., the video was watched at 10:00 A.M.-11:00 A.M., 11:20 A.M.-11:50 A.M., and so forth) can be referenced by the primary record. Thus, the records can be organized to efficiently represent what people are doing. As another example, the history records can be the primary records, where one record can provide a description of a user activity and a set of history records (referencing the activity record) can provide the data for when the user did that activity. Using history records as the primary records can make it more efficient to process the activities occurring within a given span of time. For example, the older records of the activity stream data can be compressed to potentially save storage space and to match a user's imperfect memory (for example, after six months, all the history records for a specific activity can be reduced to a single record that says the user watched the particular video on a given day while still maintaining the full activity record to resume the video.

An example schema 200 for the activity stream data structure can include one or more fields. A stream identifier (StreamID) field 202 can be used to distinguish one activity stream from a different activity stream. A user identifier (UserID) field 204 can be used to associate the activity stream to a particular user. A device reference (DeviceRefs) field 206 can provide a reference to a data structure (such as a header of a linked list) indicating any devices associated with the activity stream. For example, an activity stream can be associated with a single device or an activity stream can include information merged from multiple devices associated with a particular user. Alternatively, the activity stream can be device independent, where no device identifier is associated with the activity stream. A task reference (TaskRefs) field 208 can provide a reference to a data structure indicating the task records belonging to the activity stream. An activity reference (ActivityRefs) field 210 can provide a reference to a data structure indicating the activity records belonging to the activity stream. Fewer or additional fields are possible for the activity stream schema 200, such as fields that summarize (e.g., a field indicating a time period of the activity stream) or provide information related to the activity stream.

An example schema 220 for the task data structure can include one or more fields. A task identifier (TaskID) field 222 can be used to distinguish one task from a different task. A task type identifier (TaskTypeID) field 224 can be used to identify a type of the task. For example, one type of task can be used for grouping related activities together during a search and another type of task can be used for starting or resuming a group of related activities concurrently. An activity reference (ActivityRefs) field 226 can provide a reference to a data structure indicating the activity records belonging to the task. A name field 228 can be used to provide a name for the task. The task can be named by a user interfacing with a user interface or the task name can be automatically generated. The name can be displayed when the task is presented and a list of search results or used to resume the activities of a task, for example. An image field 230 can provide a reference to an image file used to display a reference to the task and the user interface. A relevance field 232 can be used to associate a relevance to the task. As one example, the relevance field 232 can provide a relative importance of the task, where the importance can be determined based on how often the task is performed or on other suitable criteria as another example, the relevance field 232 can provide a reference to a data structure storing tags or other information associated with the task. In particular, the tags can be used to search for tasks matching the user's criteria.

An example schema 240 for the activity data structure can include one or more fields. An activity is a pairing of an application with content. As one example, the application for a given activity can be identified using an application identity (AppIdentity) field 258 and the content can be identified using an application activity identifier (AppActivityID) field 244. Thus, a primary key for searching the activity records can be a union of the application identity field 258 and the application activity identifier field 244. The application identity field 258 can be a list of durable portable representations of an application across different platforms and/or devices. The application activity identifier field 244 can be used to identify content of the application. The application can control the identity of the activity by using a semantic identifier that is common across devices based on the actual content of the application. Using a common semantic identifier controlled by the application rather than an identifier controlled by a specific operating system can make it easier to maintain a mapping across devices for an activity identifier and the content associated with the activity identifier. An application can generate values for the application activity identifier field 244 as the application is executed, so that the application can be resumed and/or historical landmarks related to the application can be stored. This information can be referred to as a token. As a specific example, the application can be a video playback application and the content can be a particular video that is being playback. A level of detail of the content can be application specific. For example, the application activity identifier field 244 can have a value corresponding to the particular video being playback or to a specific location within the particular video (such as five minutes within the video). Thus, based on the information provided by the application, the application activity identifier field 244 can be updated at different rates. For example, one video playback application may only identify starting or stopping a video and a different video playback application may identify starting, stopping, continuing, and pausing a video. The content of the application can be encoded using an application-specific encoding scheme. As one example, watching a video at a point five minutes into the video can be encoded by a video playback application as "/watch/70248289." In one embodiment, the pair of the application identity field 258 and the application activity identifier field 244 can provide enough information for an operating system component to resume the application at the point corresponding to the value stored in the application activity identifier field 244. In another embodiment, the identity of the activity can be separated from the activation token. For example, the application activity identifier field 244 can identify a video that is being played in a video playback application, and additional information stored at a web service or in another field (such as the activation target field 246 described below) can provide a playhead (e.g., a timestamp) that tracks a user's position within the video. Thus, the application activity identifier field 244 can be fixed when it is created, and other fields can be updated as the user's context within the application is updated.

The example schema 240 can include additional fields to enable storing, identifying, searching, displaying, resuming, or providing information about the activity represented by the activity data structure. For example, an activity identifier (ActivityID) field 242 can be used to distinguish one activity from another activity. Specifically, each activity can be assigned a unique number or string for the activity identifier 242. The activation target field 246 can be used to invoke the application. For example, when an activity is started, the application can provide a uniform resource identifier (URI) or another target that can be used by the operating system to launch the application. As another example, if the application is not installed on the local device, the URI can be used to install or take the user to a webpage to install or run the application remotely. The content target field 248 can be used to enable features such as content preview or availability. For example, the content can be a document located on a remote server and the content target field 248 can be a URI referencing the document. A name field 250 can be used to provide a human-readable name for the activity when the activity is displayed or searched for. An image field 252 can provide a reference to an image to display for the activity. Additionally, fields for a reference to an animation, a sound, or other output information can be provided. A properties field 254 can be used to store properties about the activity or the application. For example, the properties field 254 can include zero or more name value pairs a content type field 256 can describe a category of the activity, such as a document, a website, a photo, and so forth. An application display name (AppDisplayName) field 260 can be used to provide a human-readable name associated with the application. An application icon (AppIcon) field 262 can provide a reference to an image or icon associated with the application. A relevance field 264 can provide a relative importance of the activity and/or a reference to a data structure storing tags or other information associated with the task. A history reference (HistoryRefs) field 266 can provide a reference to a data structure indicating any history records associated with the activity stream.

An example schema 270 for the history data structure can include one or more fields. A particular history record can correspond to an event at a particular point in time within an activity. For example, landmark events such as starting, printing, sharing, bookmarking, or completing an activity can each be recorded using different respective history records. A type field 272 can be used to classify a particular history record. For example, the types of history records can include types for user engagement, printing, sharing, full screen, completed, and so forth. An activity referenced field 274 can provide a link (e.g., appointer) to an activity record, such as the activity record associated with the history record. An event period field 276 can indicate a time range of an event covered by the history record. For some history records, a duration of zero can be appropriate. An active time field 278 can indicate an amount of time during the event period field 276 where the application was active. The user can be engaged with the application while the application is active. As a specific example, an application can be opened from 10:00 AM to 11:00 AM and the active duration can be 22 minutes. Thus the event period field 276 can indicate the activity lasted one hour while the active time field 278 can indicate there was an active duration of 22 minutes. A reporting source field 280 can indicate a source application that caused the history record to be generated. For example, the source application can be an application, an operating system, a network accessible service, a digital assistant, and so forth. A device identifier field 282 can be used to indicate a device where the event occurred. A display text field 284 can be used when the history record is being displayed. A report time field 286 can indicate when the history record was generated or last updated. A local relevance field 288 can be used indicate how relevant the record is compared to other records that are active over the same time period. For example, the local relevance field 288 can be used to differentiate between an application performing a background process (e.g., playing audio and a background) versus an application performing a foreground process (e.g., a word processing document in a focus of the operating system). Additional fields are possible, such as a device location field indicating where the activity occurred, and so forth.

Figure 3:
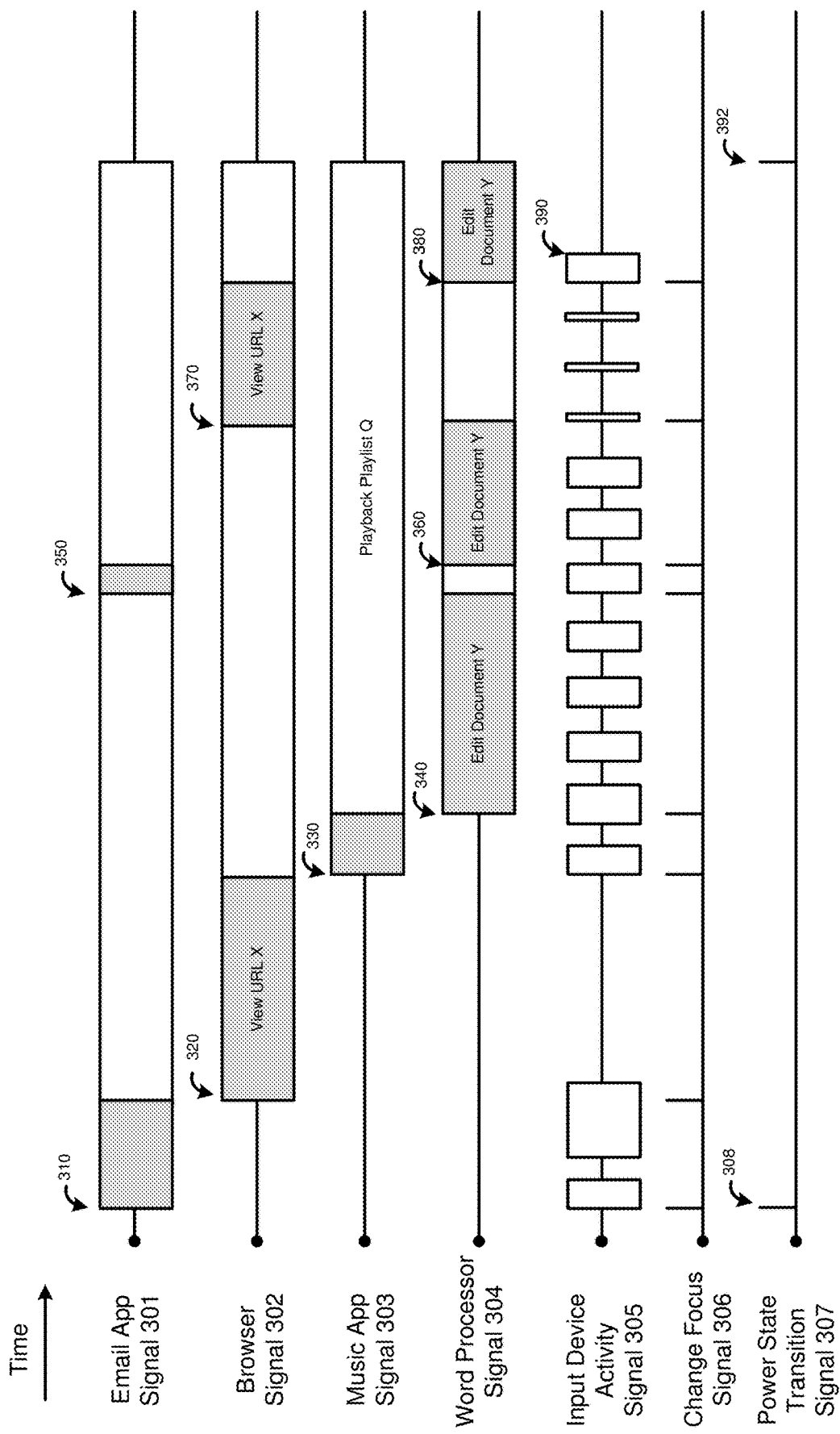
FIG. 3 illustrates an example of various signals used to determine the user engagement with one or more software applications.

FIG. 3 illustrates an example timing diagram showing various signals 301-307 used to determine the user engagement with one or more software applications. Specifically, FIG. 3 illustrates an example of how the various signals 301-307 may change as a user performs different activities on the computing device. The signals 301-307 can be classified as application signals 301-304 and as operating system signals 305-307. Each of the application signals 301-304 can correspond to a different application or a different instance of an application executing on the computing device. For example, respective applications can include an agent for interfacing to an activity platform of the operating system via one or more signals. The signals can change at various points in the execution of the applications, such as when the applications are started, paused, terminated, or when some other event occurs. Additionally, the signals can provide information about the application that can be used to resume the application at a point where the information is captured. As specific examples, an email application can produce an email application signal 301, a web browser can produce a browser signal 302, a music player application can produce a music application signal 303, and a word processor application can produce a word processor signal 304.

The operating system signals 305-307 can include an input device activity signal 305, a change focus signal 306, and a power state transition signal 307, for example. The input device activity signal 305 can indicate when an input device is active, such as when characters are being pressed on a keyboard, when a mouse is being clicked or moved, or when speech is detected at an output of a microphone. Alternatively, separate signals can be generated for each input device. A focus of an operating system user interface can be an application with a window that is in a foreground of the user interface and can accept input from an input device. The change focus signal 306 can indicate when the focus changes, such as when an application is brought to the foreground and/or when an application is minimized. The change focus signal 306 can indicate which application is entering the focus. As illustrated in FIG. 3, the application in focus is indicated by the corresponding application signal being shaded. The power state transition signal 307 can indicate when the computing device is transitioning from a lower power state to a higher power state or from a higher power state to a lower power state. The power state transition signal 307 can indicate which power state the computing device is transitioning into.

The user engagement can be determined by monitoring the different signals 301-307 and generating an activity stream based on the different signals 301-307. For example, the activity stream can include an activity for each of the applications launched on the computing device. The activities can be added to the activity stream when the applications are started and/or when different events occur within the application or within the operating system. The activity records can be updated when the activity is created and as the applications are executed and/or terminated. As illustrated in FIG. 3, an activity for email can be created at time 310, an activity for web browsing can be created at time 320, an activity for interacting with a music application can be created at time 330, and an activity for editing a document can be created at time 340.

As an example of how the signals can change, at time 308, the computing device can transition from a low-power state to a higher power state, such as when the computing device is powered on or transitions from a standby power state to an active power state. At time 310, an email application can be started and the email application signal 301 can be activated. Activation of the email application signal 301 can cause an activity record to be created for the email application. The user can use the email application to read email, file emails, reply to emails, and perform various other functions within the email application. The email application signal 301 can be encoded to indicate various events occurring within the email application. As one example, the email application signal 301 can provide only coarse-grained information, such as when the email application is started at time 310 and when the email application is paused at time 320. As another example, the email application signal 301 can provide fine-grained information, such as that email was being read, email was being replied to, a particular email was being read, a particular email was being replied to, an email was being moved into a folder, and so forth. The activity record for the email application can be updated each time an event is detected on the email application signal 301.

At time 320, the focus of the operating system user interface changes from the email application to a web browser application. For example, the user can start a web browser, bringing the web browser into the focus of the operating system and transitioning the email application out of the focus. The browser signal 302 can indicate events occurring within the browser, such as a particular URL being viewed. Activation of the browser signal 302 can cause an activity record to be created for the browser application.

At time 330, the focus changes from the browser application to a music player application. For example, the user can be searching and/or buying music to play with the music player application. The music player application can be backed by a music purchasing and distribution service, which can provide information that can be propagated via the music application signal 303 or via a different signal. When the play list is started, the music application signal 303 can indicate that audio playback is started. Searching for music and playing music can be separate activities or part of the same activity. Audio playback can be a background activity that is active during other activities. For example, a word processor application can be started at time 340 and a document can be edited concurrently with the audio playback activity. Thus, an editing activity and an audio playback activity can be active concurrently. In other words, based on the multiple interacting signals, the system can determine that the user is engaged with both the word processor application and the music player application at the same time.

The word processor signal 304 can indicate events occurring within the word processor application, such as editing, printing, saving, and so forth. Additionally, the word processor signal 304 can indicate additional state of the application that can be used to resume the word processor application at the point where the additional state is recorded, such as a document being edited, a position where the user was editing, clipboard information, an active menu, and so forth. The information encoded in the word processor signal 304 can be captured, processed, and/or stored in the activity record for the word processor application.

At time 350, the focus can change from the word processor application to the email application. For example, a user may see a notification that a new email message has arrived, the user can open the email application, read and delete the new email message, and then minimize the email application to return to the word processor application at time 360. In this example, there are several options for how to characterize the use of the email application from time 350 to time 360. As one example, the use of the email application from time 350 to 360 can be a separate activity from using the email application from time 310 to time 320. As another example, the use of the email application from time 350 to 360 can be part of the same activity as using the email application from time 310 to time 320. As another example, the use of the email application from time 350 to 360 can be ignored altogether. The treatment of the actions from time 350 to 360 can be based on analysis within the email application and/or analysis using some or all of the signals 301-307.

At time 360, the focus can return to the word processor application. As with the event beginning at time 350, the event beginning at time 360 can be classified in multiple different ways. As one example, a length of the period between times 350 and 360 can be used to determine whether the event beginning at time 360 is included within a larger activity beginning at time 340 or whether the event beginning at time 360 is a new activity.

At time 370, the focus can return to the browser application. In this example, the user is viewing the same URL so the event beginning at time 370 can be included with the same activity beginning at time 320. Alternatively, the events beginning at time 320 and time 370 can be classified as separate activities. At time 380, the focus can return to the word processor and at time 390 input reported by the input device activity signal 305 can end. The computing device can go into a standby state or can power down at time 392 based on a lack of input device activity within a given amount of time. The active activities (such as the word processing activity) can pause or end at time 390 when the input device activity goes idle or when the computing device transitions to the lower power state at time 392.

Figure 4:
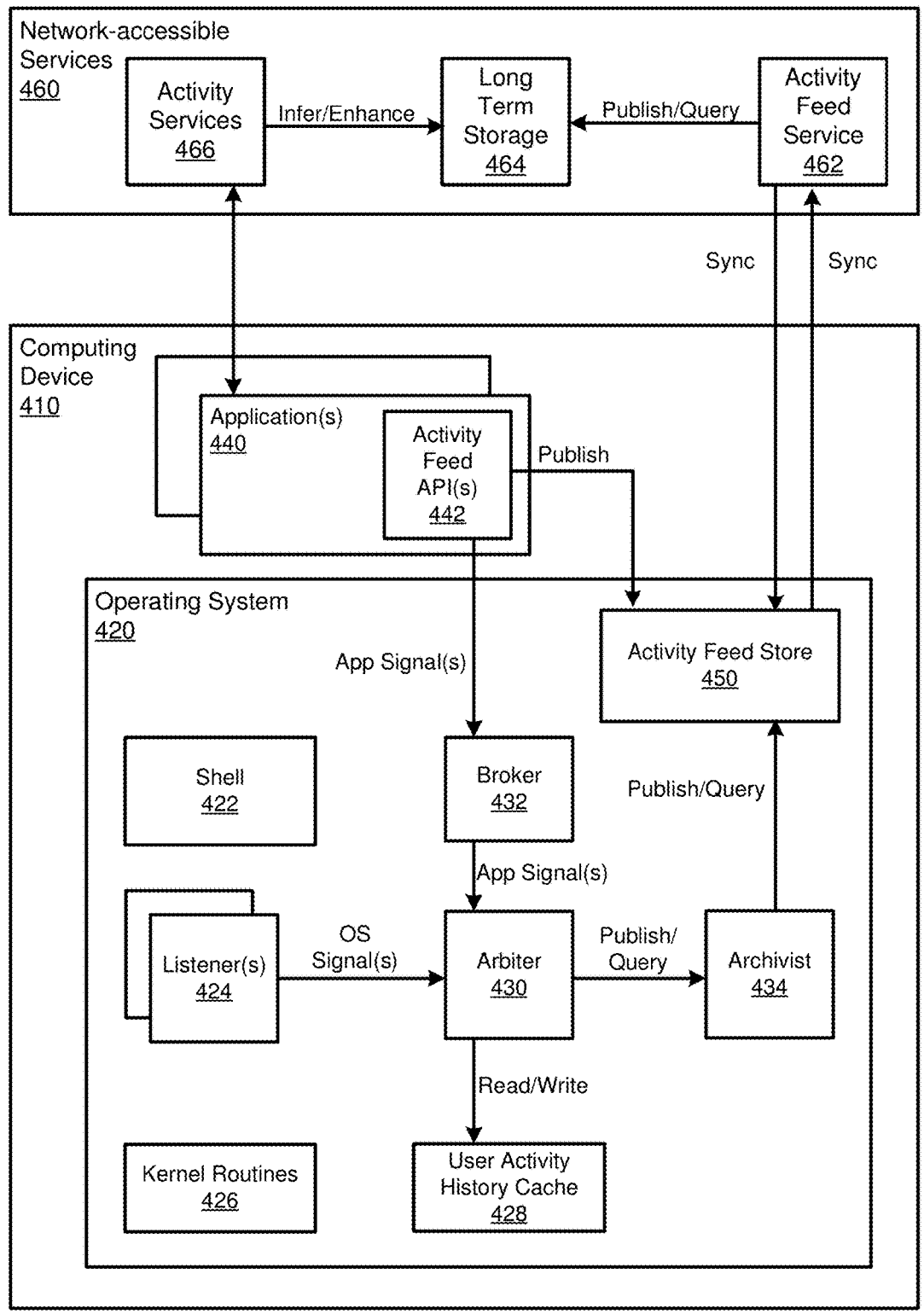
FIG. 4 is a system diagram of an example system for determining a user engagement with one or more software applications.

FIG. 4 is a system diagram of an example system 400 for determining a user engagement with one or more software applications 440. The system 400 can include a computing device 410 that includes computer hardware (e.g., a processor and memory) and software for executing an operating system 420 and one or more applications 440. The computing device 410 can communicate with network-accessible services 460, such as activity services 466 and an activity feed service 462.

A network-accessible service is a software function provided at a network address over a network (such as the Internet). For example, network-accessible services can execute on a dedicated server computer or within a cloud environment connected to the network. Clients can initiate service requests to the servers and the servers can process the requests and return appropriate responses. The client service requests can be initiated using, for example, an application programming interface (API) request. An API request is a programmatic interface to a defined request-response message system, typically expressed in JSON or XML, which is exposed via the network, most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

The operating system 420 can include different software routines, modules, or components for managing different aspects of the execution of programs (e.g., the applications 440) and for interfacing with the hardware of the computing device 410. As one example, the operating system 420 can include a shell 422 for interfacing with a user of the computing device 410 and kernel routines 426 for managing resources of the computing device 410. For example, the shell 422 can provide a windowing system and tools for listing, launching, pausing, and closing applications 440 using one or more windows. The shell 422 can provide tools for opening, positioning, sizing, minimizing, selecting, and/or closing windows. Additionally, the shell 422 can provide an interface for listing activities associated with a user and/or for resuming activities associated with the user. For example, the shell 422 can render the user engagement history as activities occurring in a chronological order within a timeline associated with the user. As another example, the shell 422 can reactively or proactively suggest an activity from the activity stream to resume. The suggested activities can be in response to a search query or to an event identified by the operating system 420. In particular, when a user's machine is unlocked, a suggestion for resuming the activity that the user was last doing on the current machine or another device can be listed. As another example, if a word processing document is opened, the shell 422 can suggest opening web pages that were being used concurrently with the word processing document. The shell 422 can include a digital assistant that can use voice commands to display or interact with activities of an activity stream. Additionally or alternatively, a digital assistant can be launched by the shell 422 as an application distinct from the shell 422.

The kernel routines 426 can perform low-level (e.g., close to the hardware) and/or performance-sensitive routines of the operating system 420. Specifically, the kernel routines 426 can manage the loading and removal of applications 440 and other routines into a memory of the computing device 410; the kernel routines 426 can manage the virtual memory and storage resources of the computing device 410; the kernel routines 426 can manage processes and/or threads executing on a processor of the computing device 410; the kernel routines 426 can manage power states of the computing device 410; the kernel routines 426 can provide an interface for applications 440 and other routines to send and receive network packets using a network interface controller over a network; and the kernel routines 426 can enable inter-process communication between different routines executing on the computing device 410.

The operating system 420 can include an activity monitor component that is used to compile a history of user engagement with the software applications 440 on the computing device 410. The functions of the activity monitor component can be distributed among various other components, such as listeners 424, a broker 432, an arbiter 430, a user activity history cache 428, and archivist 434, and an activity feed store 450. In alternative embodiments, the functions of the activity monitor component can be distributed into fewer or more components.

The listeners 424 can be used to generate signals representing states of the hardware and/or the operating system 420. For example, a listener can be incorporated into a device driver so that a hardware component of the computing device 410 can interface with the other components of the activity monitor component. As specific examples, device drivers for keyboards, mice, microphones, video cameras, and other input devices can generate signals indicating input activity. A user-present listener can be used to determine when a user may be using the computing device 410. For example, the user-present listener can monitor whether input devices are receiving inputs (such as keystrokes or mouse movements) that are indicative of a user being present. The user-present listener can measure an amount of time that has passed from the last input event and can indicate the user is away after a specified amount of time has elapsed since the last input event. An application view listener can determine when an application has a view that gains or loses focus of the operating system 420. An application view title change listener can be used to monitor for changes to a title of an application window and to report the changed title name. For example, the title of an application window can be used to describe an activity and/or to determine whether an event has occurred within an activity. Thus, the listeners 424 can generate signals indicating various states such as the application in a focus of the operating system 420, a particular activity of a user input device, a position of a window displaying an output of an application, a state of a window displaying an output of an application, a mouse cursor position, an audio output, a detected eye position, a detected hand position (e.g., pointing, pinching, spreading, swiping, flicking, or tapping), and so forth.

The broker 432 can manage components and processes within the activity monitor component and can interface with the shell and/or external components, such as the applications 440. Specifically, the broker 432 can create instances of the other components when the activity monitor component is started. The broker 432 can act as an interface to the shell 422, such as when a command is entered to view a list of activities or an activity. Additionally, the broker 432 can forward requests from the shell 422 or the applications 440 to flush the activity streams. In an alternative embodiment, the functions of the broker 432 can be distributed among the other components of the operating system 420.

The applications 440 can communicate with the activity monitor component using signals generated within the applications 440. Specifically, each of the applications 440 can include an activity feed API 442 for communicating with the broker 432 and/or the arbiter 430. A protocol or interface of the activity feed API 442 can be used to encode the signals generated within the applications 440. The signals can include information that is common for all applications interfacing with the activity monitor component, such as when an application begins, pauses, or ends. The signals can include information that is specific to a particular application, such as a state of video playback, a state of audio playback, a level of a game, completing a game level, being credited with an achievement, making a transaction in banking software, sharing a document, adding a user to a conversation, an event type, a record event, a save event, a print event, an edit event, and so forth.

The arbiter 430 can be used to process signals received from the listeners 424 and the applications 440 to generate an activity stream indicative of a user engagement with the applications 440. The signals can be processed using different numbers of stages and/or combinations of signals. For example, a noisy signal that changes rapidly can be passed through a low-pass filter so that noise in the signal is reduced. The filtered signal can be combined with other non-filtered signals to determine the user engagement. As another example, one signal can be masked when another signal is active. As another example, one signal can be amplified based on a value of another signal. As another example, groups of signals can be multiplexed based on a value of one or more control signals. Specifically, an application can assert multiple signals indicating multiple active functions and other signals (such as from the operating system) can be used to select one of the signals from the group of active signals.

The arbiter 430 can create and update an activity stream data structure (such as described above with reference to FIG. 2) comprising records for tasks, activities, and/or event histories. Records of the activity stream data structure can be stored in a user activity history cache 428 and/or communicated to and archivist module 434 for local or remote storage. The user activity history cache 428 can store a partial activity stream for a user. For example, the partial activity stream can include recent and/or speculative updates to the activity stream that can be referenced by the arbiter 430 when generating additional records of the activity stream. As a specific example, the user activity history cache 428 can include multiple records indicating that a given activity is in progress. As the given activity continues, the multiple records can be merged by the arbiter 430 into fewer or a single record for the given activity. The records can be flushed or published to the archivist module 434 based on various events, such as a request to flush, the termination of an activity, a user presence being lost, or a specified time period elapsing.

The archivist module 434 can communicate updates to the activity stream to the activity feed store 450. The activity feed store 450 can store a local copy of the activity stream and can annotate the activity stream with information received from the applications 440 and/or the activity feed service 462. Additionally, the activity feed store 450 can receive activity streams (such as those created from another device associated with the user) from the activity feed service 462. The activity feed store 450 can merge the different activity streams into a single activity stream or it can communicate the received activity streams to the arbiter 430 so that the arbiter 430 can merge the different activity streams. The activity feed store 450 can cause an activity stream or an update to an activity stream to be transmitted to the activity feed service 462. Communication between the activity feed store 450 and the activity feed service 462 can occur at various synchronization events. For example, the synchronization events can include transitioning the computing device 410 to a lower power state or a higher power state, the expiration of a specified time period, the initiation or termination of a given activity, the initiation or termination of the activity monitor component, a synchronization command, and so forth.

The activity feed service 462 can publish the activity streams for a user in long-term storage 464. The activity streams stored in long-term storage 464 can be used and/or annotated by the activity services 466. For example, one of the activity services 466 can be a backing service for an application 440 and the backing service can annotate activity records associated with the application 440. Alternatively, the backing service can communicate with the activity feed service 462 so that only the activity feed service 462 can modify the activity streams stored in long-term storage 464. A backing service is a network-accessible service that is automatically called by an application to perform a function of the application. Additionally or alternatively, the backing service can communicate information to the application 440 and the information can be communicated via a signal between the application 440 and the activity monitoring component.

The arbiter 430 can be used to combine signals received from the listeners 424 and the applications 440 to generate an activity stream indicative of a user engagement with the applications 440. Combining the signals to determine the user engagement can be performed in various different ways, such as by using machine learning, statistical techniques, a heuristic, and/or other rules-based processing. As one example, a user engagement can be determined by matching a pattern of one or more signals to a user mental model. Combining the signals can include combining different signals at the same point in time and combining different signals from different points in time. Additionally, an importance of signals can be weighted and the weighting can change over time. For example, the weighting can change based on a history of how accurate the signals characterize a particular activity.

By combining signals from the listeners 424 and the applications 440 to generate the activity stream, the user engagement can potentially be more accurately determined than by using signals only from the listeners 424 or only from the applications 440. For example, the signals from the applications 440 alone can indicate application-specific information, but the signals generally cannot discern if the user is present, if the application is in the focus, if the cursor is hovering over an application window, and so forth. The signals from the listeners 424 can indicate operating system and device states, such as which applications are executing, but the signals generally cannot discern the activities occurring within the application. Thus, by combining the signals from the listeners 424 and the applications 440, a more complete view of the user engagement can be determined.

The user engagement can be determined based on the types of the software applications executing on the computing device 410. For example, the types of software applications can be classified into broad categories such as a foreground application, a background application, and a mixed foreground-background application. An application can be classified as a foreground application when the user is generally engaged with the application when the application is the focus of the operating system; an application can be classified as a background application when the user can be engaged with the application with little to no interaction and/or when a different application is a focus of the operating system; an application can be classified as a mixed application when additional signals from the application, other applications, or the operating system are used to determine whether the user is engaged with the application. For example, a word processing application can be a foreground application, a music player application can be a background application, and an email application can be a mixed application. Generally, a user can be engaged with a foreground application when the application is the focus of the operating system and there is activity from an input device; a user can be engaged with a background application when the application is executing and performing a function that can be performed concurrently with another application; and the user can be engaged with a mixed application based on a set of rules that are specific for the application. As a specific example, the user can be engaged with a word processing application when a document is loaded into the application and activity, the application is the focus, and activity is detected from an input device. The user can be engaged with a music player application when a song or play list is playing and the computing device 410 is not muted. A background application can be classified as a lower relevance activity than a foreground application. Thus, the word processing application can be classified as more relevant than the music player application when both applications are used concurrently. The user can continue to be engaged with the word processing application even when short duration interruptions occur. For example, an email application can become the focus when a new email is received. However, if the email application is used for a short period of time (such as when a user merely looks at an inbox of the email application or deletes a new unimportant email and then minimizes the email application) before returning to the word processing application, then the user can continue to be engaged with the word processing application over the period when the email application was used. The email application can be a mixed application. For example, the user can be classified as engaged with the email application when the user reads and/or responds to a specified number of emails or files a specified number of emails. The user can be classified as engaged with the email application when the user keeps the email application in the focus for a specified period of time. However, the user can be classified as not engaged with the email application when the email application is only accessed for short periods of time and/or when no emails are composed. Thus, a brief interaction with the email application while performing the word processing activity can be classified as being a low relevance activity or no activity at all.

The user engagement can be determined by matching patterns of signals to a user mental model. A user mental model can include a number of states corresponding to a model of user behavior. For example, the user mental model can include states for editing a document, watching a video, reading a document, listening to audio, playing a game, being present, being idle or absent, handling an interrupt, and so forth. The signals corresponding the operating system states can be interpreted differently depending upon the state of the user model. For example, when a word processing application is in the focus and the user mental model indicates a document is being edited, input device activity can indicate that the document is continuing to be edited, while a lack of input device activity can indicate that the document is not being edited. As another example, when a music player application is playing back an audio track, input device activity may not be relevant to whether the user is continuing to listen to the audio.

The user engagement can be determined by combining the signals in additional ways to determine which applications are active. As one example, an orientation of windows can be used to determine a user engagement. Specifically, having two non-occluded windows side-by-side can indicate that multiple applications are active at the same time. A confidence in the decision that both applications are active can be increased using eye-tracking technology. For example, a video camera pointed toward a user can detect a user's eyes and where the eyes are focused on a display screen of the computing device 410. If the user's eyes move back and forth between the different windows then both applications can be active and the user can be engaged with both applications even though only one of the applications can be in the focus at any given time. As another example, a pattern of usage of the different applications can be used to determine the user engagement. Specifically, the user may switch back and forth between viewing a webpage in a web browser application and editing a document and a word processing application. During the time of the switching back and forth, the user can be engaged with both of the applications. As another example, a position of a cursor relative to an application window can be used to determine a user engagement.

Figure 5:
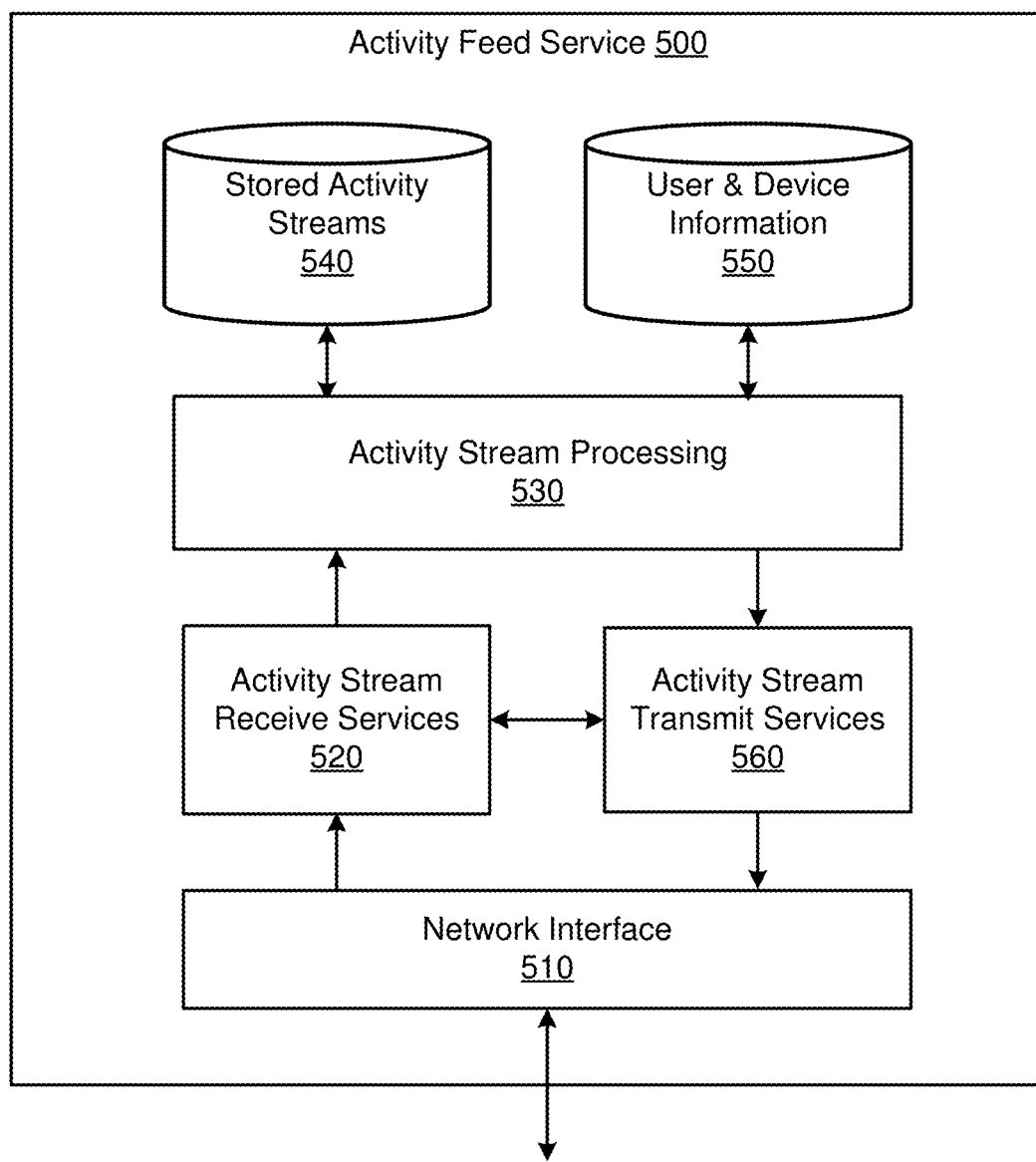
FIG. 5 is a system diagram of an activity feed service for determining a user engagement across computing devices and/or platforms.

FIG. 5 is a system diagram of an activity feed service 500 for determining a user engagement across computing devices and/or platforms. The activity feed service 500 can include one or more network-accessible services executing on dedicated server computers or within a cloud environment connected to a network, such as the Internet. The activity feed service 500 can include a network interface 510 for communicating over the network. For example, the network interface 510 can detect network packets that are destined for the activity feed service 500 and can route receive network packets to the activity stream receive services 520. The network interface 510 can also format packets for transmission over the network from activity stream transmit services 560.

The activity stream receive services 520 can receive messages from a client device connected to the activity feed service 500. The messages from the client devices can include messages for: uploading an activity stream; updating an activity stream; synchronizing a client device with uploaded activity streams; reporting a device connecting to the activity feed service 500; reporting a device disconnecting from the activity feed service 500; requesting a device be associated with the user; and so forth. The activity stream receive services 520 can decode incoming messages to determine various properties of the message, such as a user identifier, a device identifier, an activity stream identifier, and a message type. For messages that are associated with a particular activity stream, the decoded information from the message can be transmitted to an activity stream processing module 530 for further processing. Additionally, the activity stream receive services 520 can communicate with the activity stream transmit services 560. For example, messages related to a device status (such as connecting or disconnecting from the network) can be routed to the activity stream transmit services 560.

The activity stream processing module 530 can manage activity streams for one or more users using one or more devices and/or platforms. Managing the activity streams can include creating and/or storing an activity stream, updating an activity stream based on inputs from a user's devices and/or application services, synchronizing activity streams across different devices and/or platforms, merging the activity streams from different devices for a given user, annotating or modifying activity streams, tracking associations between users and devices, and so forth.

The activity stream processing module 530 can store activity streams for a given user. A new activity stream can be created for user based on a message to create a new activity stream or based on a message to update an activity stream that is not currently stored at the activity feed service 500. For example, the activity streams can be stored in a stored activity stream database 540 and indexed by various properties such as a user identifier, a device identifier, and/or an activity stream identifier. When an update message is received, an identifier within the message can be used to find any activity streams stored in the stored activity streams database 540. The update message can include an activity record, a history record, a task record, a portion of an activity stream (e.g., a group of records associated with a time period), or a complete activity stream. The information within the update message can be merged with the information found within the stored activity streams database 540 so that an updated activity stream can be written back to the activity streams database 540.

The activity stream processing module 530 can be used to annotate an activity stream with information received from an application service and/or based upon processing of the activity stream. For example, a device may have incomplete information about an activity and the backing service of the application associated with the activity can communicate directly with the activity feed service 500 rather than the device executing the application. The information from the backing service can be annotated to the activity stream so that the activity stream has a more complete set of information associated with the activity. Additionally, the activity stream processing module 530 can process the activity stream to potentially deduce higher order activities and/or tasks. For example, some client devices may have reduced processing capabilities and/or incomplete information about the activity stream and so the activity feed service 500 can supplement the processing power of the client devices. On the other hand, other client devices may have increased processing capabilities and so a majority of activity stream processing can be performed at the client device. By processing the activity stream at the client device, local activities associated with the device can be condensed before transmitting the local activity stream to the activity feed service 500 which can potentially reduce bandwidth associated with communications between the client device in the activity feed service 500.

The activity stream processing module 530 can be used to merge activity streams for a given user that is using multiple devices and/or platforms. For example, the user can perform the same activity on different devices at different times. As a specific example, the user can be reading a webpage on a mobile device while commuting to work and then the user can finish reading the webpage on a work computer after the user arrives at work. Here, the activity is reading the webpage. The work computer and a mobile device can be different platforms, but each can generate an activity stream for the same activity. Specifically, the work computer and the mobile device can send separate updates to the activity feed service 500 for the activity corresponding to the different time periods when the user was reading the webpage on the respective devices. The activity feed service 500 can recognize that the different updates belong to a common activity and can merge the different activity streams into a single activity stream. Specifically, the common activity can be recognized by determining that the same URL was accessed from two different web browsers on two different platforms. Both the work computer and the mobile device can each send an update comprising one or more history records associated with reading the webpage, and the activity feed service 500 can merge the different history records into a single history record.

The activity stream processing module 530 can detect that an activity stream has been merged and can schedule an update back to the client devices used to generate the individual activity streams of the merged activity stream. For example, devices belonging to a user can be registered and stored in a user and device information database 550. For example, the user can subscribe to the activity feed service 500, such as by downloading an app or installing an operating system designed to communicate with the activity feed service 500. The user can register multiple devices and the activity feed service 500 can generate a device graph associated with each user. The device graph can include the devices of the user, the platforms associated with each device, software installed on each device, a classification of the device (such as a work device or home device), and other information associated with the device and/or user. The activity stream processing module 530 can identify the devices associated with the user and can schedule the update to the user's devices.

Additionally, the activity stream processing module 530 can determine whether an activity stream from one user device is to be merged and/or transmitted to another user device. For example, the user may have a work computer, a mobile phone used for work, a home computer, and a game console used at home. The activity stream processing module 530 can analyze the activities and characteristics of the devices to determine whether the activity streams are to be merged or kept separate. For example, an activity stream corresponding to a game played on the game console can be shared between the game console and the home computer, but may not be shared with the work computer and the mobile phone used for work. As another example, an activity stream corresponding to editing a document on the work computer can be sent to the mobile phone, but not the game console. The activity stream processing module 530 can automatically infer rules for sharing activity streams across devices based on characteristics stored in the device graph. Additionally or alternatively, the user can set rules (such as during a registration process) for sharing among the different devices of the user.

Additionally, the activity stream processing module 530 can create and/or modify metadata associated with an activity stream before transmitting the activity stream to the user's devices. As one example, a relevance of the activity stream can be adjusted based on the device where the activities of the activity stream are captured from or being transmitted to. For example, a game console can identify a document for a word processing program that the user was editing (since it is in the user's activity stream), but the game console might only suggest resuming games because the games are more relevant for the game console. As another example, on a home PC, a most recent activity might be playing a game on the console but instead the system can suggest resuming a work-related task because the work-related tasks are more relevant for the home PC.

The activity stream processing module 530 can also determine whether to merge and/or share activity streams between devices based on software installed on the devices. As one example, when a given software application is installed on a first device but not a second device, an activity stream associated with a given application can be stored on the first device and filtered from the second device. Alternatively, the activity stream processing module 530 can detect that the second device does not have the given application installed but it is capable of executing a build of the given application. In this case, the activity stream can be transmitted to the second device with information for installing and running the build of the application so that the activity can be continued on the second device. For example, the user can choose to resume the activity on the second device, and the device can install the application and resume the application at a state recorded by the activity stream.

The activity stream transmit services 560 can transmit the scheduled updates of the activity streams to the individual devices of the user. For example, the activity stream transmit services 560 can include a presence service for detecting which of the user's devices are active and connected to the network. The updates to the activity streams can be transmitted to the devices at various times and/or various conditions. For example, the updates to an activity stream can be sent in response to detecting that the device has transitioned from a lower power state to a higher power state (e.g., such as when a device is powered on or brought out of a standby mode). As another example, the updates to an activity stream can be sent in response to one device updating an activity stream that is stored on other devices of the user. Thus, an activity stream can be updated seamlessly in near real-time across a user's devices. As another example, the updates to an activity stream can be sent in response to registering a new device for the user so that the new device can be populated with information from activity streams of the user's other devices. Thus, registering a new device can enable a user to quickly use the new device to continue an activity started on a different device.

Figure 6:
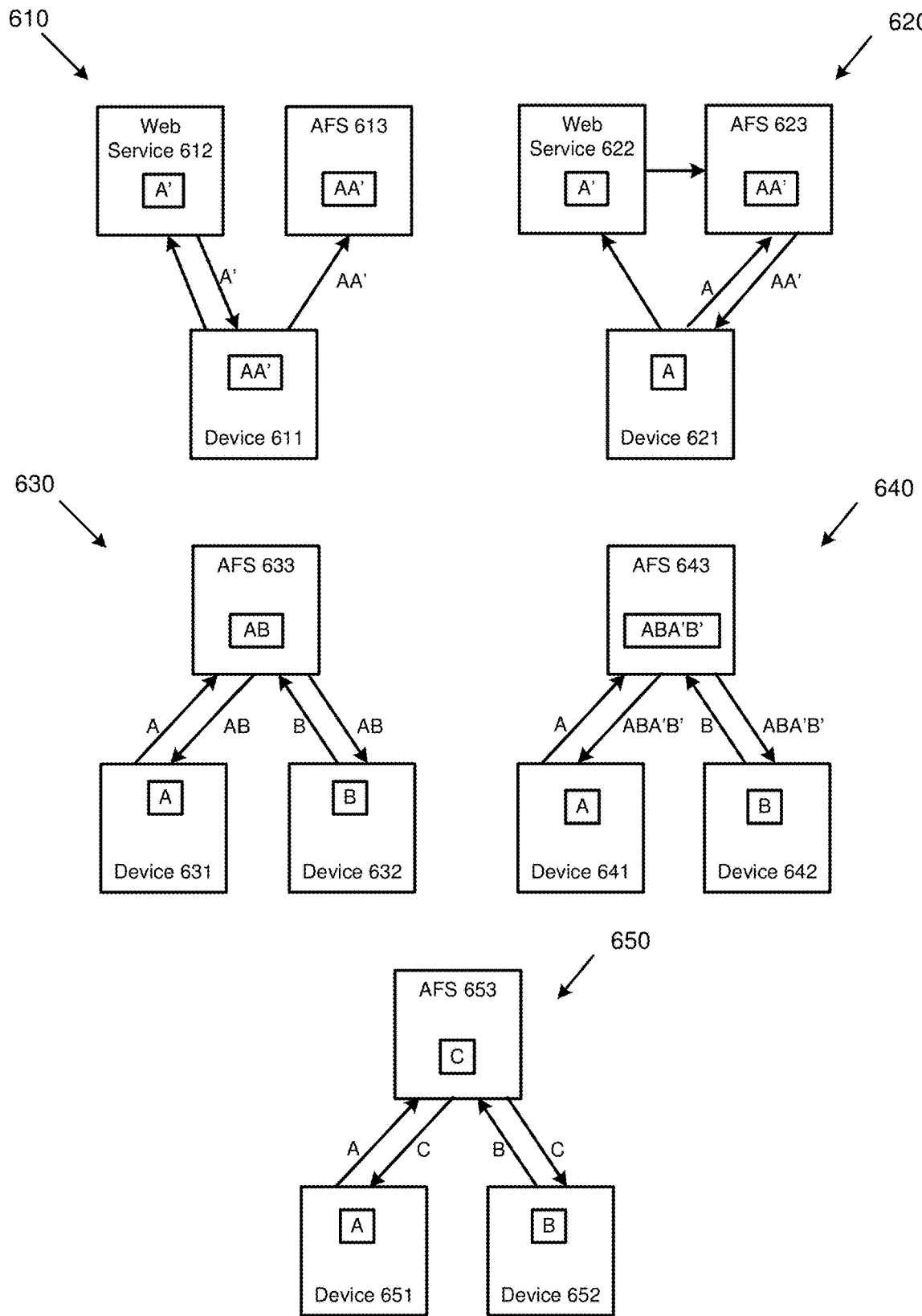
FIG. 6 illustrates various examples of sharing user engagement across computing devices and/or platforms.

FIG. 6 illustrates various examples of sharing user engagement across computing devices and/or platforms. For example 610, a client device 611 can communicate with a web service 612 and an activity feed service (AFS) 613. A user can use the device 611 to perform an activity and generate an activity stream A. The activity can be performed using functions of the web service 612 and the web service 612 can augment the activity stream A using the information A'. An annotated activity stream AA' can be sent to the activity feed service 613 for storage and/or for dissemination to other devices.

For example 620, a client device 621 can communicate with a web service 622 and an activity feed service (AFS) 623. A user can use the device 621 to perform an activity and generate an activity stream A. The activity can be performed using functions of the web service 622 and the web service 622 can produce information A' which can characterize and/or supplement the activity stream A. The web service 622 can transmit the information A' to the activity feed service 623. The device 621 can transmit the activity stream A to the activity feed service 623, where the activity stream A can be merged with the information A' to create the annotated activity stream AA'. The annotated activity stream AA' can be sent to the device 621 and to other devices of the user.

For example 630, a first client device 631 and a second client device 632 can communicate with an activity feed service (AFS) 633. The user can use the device 631 to perform an activity and generate an activity stream A. The activity stream A can be transmitted from the device 631 to the activity feed service 633. Similarly, the user can use the device 632 to perform an activity and generate an activity stream B, which can be transmitted to the activity feed service 633. The activity feed service 633 can determine that the devices 631 and 632 are associated with the same user and can send updates to the respective devices. As one example, the activity feed service 633 can determine that the activity streams A and B are associated with the same activity and the activity streams can be merged into a single activity stream AB. The activity stream AB can have fewer records than a total count of activities in A plus a count of activities in B of the activity streams A and B due to some records being merged. As another example, the activity feed service 633 can determine that the activity streams A and B are associated with different activities and the devices can be updated with unmodified activity streams from the other device. Thus, each of the devices 631 and 632 can include records of user engagement on both of the devices 631 and 632.

For example 640, a first client device 641 and a second client device 642 can communicate with an activity feed service (AFS) 643. The user can use the device 641 to perform an activity and generate an activity stream A, which can be transmitted to the activity feed service 643. Similarly, the user can use the device 642 to perform an activity and generate an activity stream B, which can be transmitted to the activity feed service 643. The activity feed service 643 can determine that the devices 641 and 642 are associated with the same user and can send updates to the respective devices. As one example, the activity feed service 643 can determine that the activity streams A and B are associated with the same activity and the activity streams can be merged into a single activity stream AB. Additionally, the activity feed service 643 can annotate and/or supplement the merged activity stream with additional information A' and B', such as information that is received from a backing service of the application executing on the respective devices and/or information that is produced by the activity feed service 643 by analyzing the activity streams A and B. The annotated merged activity stream ABA'B' can be transmitted to each of the devices 641 and 642. As another example, the activity streams A and B can be associated with different activities and the activity stream ABA'B' can represent activity streams for two different activities.

For example 650, a first client device 651 and a second client device 652 can communicate with an activity feed service (AFS) 653. The user can use the device 651 to perform an activity and generate an activity stream A, which can be transmitted to the activity feed service 653. Similarly, the user can use the device 652 to perform an activity and generate an activity stream B, which can be transmitted to the activity feed service 653. The activity feed service 653 can determine that the devices 651 and 652 are associated with the same user and can send updates to the respective devices. The activity streams A and B can be classified as different activities on the respective devices that generate the activity streams A and B. However, the activity feed service 653, using information from backing services or from additional processing, can determine that the activity streams A and B are sub-streams of a larger activity having an activity stream C. The activity stream C can be downloaded to the respective devices 651 and 652 and can replace the incomplete activity streams that were originally generated. As a specific example, the device 651 can be a desktop computer and the device 652 can be a mobile phone capable of receiving text messages. The computer 651 can be used to enter a login and password to a website and the phone 652 can be used to receive a security code as part of a multifactor authentication scheme. The computer 651 can classify the activity as web browsing and the phone 652 can classify the activity as texting. However, the activity feed service 653 can receive information from a backing service (e.g., a service associated with a webhost serving the webpage) indicating that a login to an online banking website occurred using multifactor authentication. By combining the information from the backing service (not shown), the computer 651 and the phone 652, the activity feed service 653 can reclassify the activities reported by the computer 651 and the phone 652 into a broader activity, such as an online banking activity (e.g., activity stream C). A new activity stream for the online banking activity can be downloaded to the computer 651 and the phone 652 and the respective activity streams for web browsing and texting can be replaced with the activity stream for the online banking activity.

Example Methods

Figure 7:
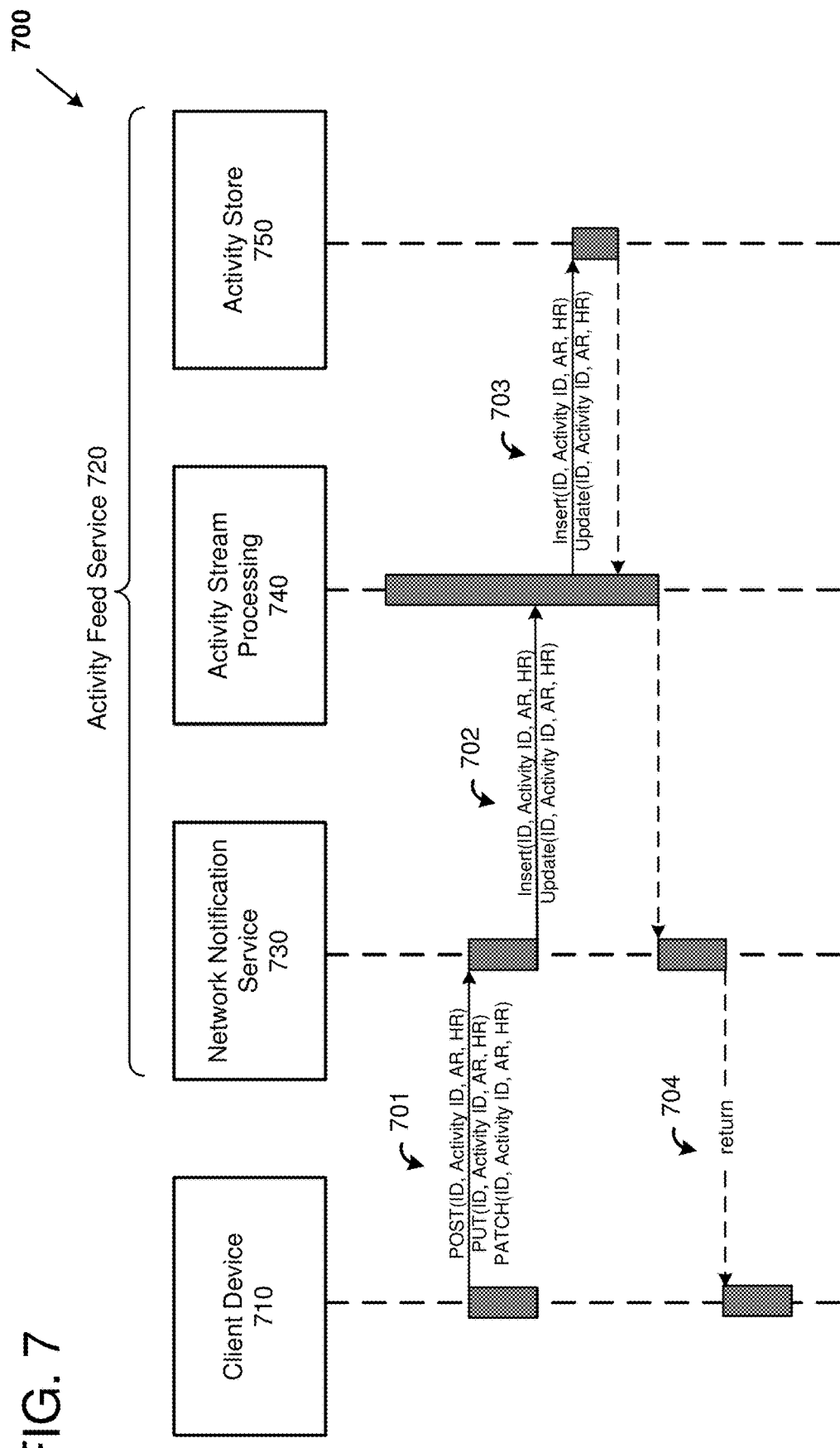
FIG. 7 shows a sequence diagram of an example method of ingesting user engagement history from a computing device (e.g., an activity feed client) at an activity feed server or service.

FIG. 7 shows a sequence diagram of an example method 700 of using an activity feed service 720 to ingest user engagement history from a client device 710. The client device 710 can include computer hardware and software for executing applications (such as an activity feed client application) and communication with the activity feed service 710 over a network. The activity feed service 710 can include one or more network-accessible services (e.g., a network notification service 730, an activity stream processing service 740, and an activity store service 750) executing on dedicated server computers or within a cloud environment connected to the network. The network notification service 730 can be used by the client device 710 as a primary interface between the client device 710 and the activity feed service 720.

At 701, the client device 710 can upload user engagement history to the activity feed service 720. For example, the client device 710 can determine a user engagement with applications executing on the client device 710 and can create activity stream records corresponding to the user engagement. The client device 710 can transmit the activity stream records to the activity feed service 720 as they are created, at specified times, or during specified conditions. For example, the user engagement history can be uploaded every hour that the client device 710 is active, in response to a landmark event occurring on the client device 710, or in response to the client device 710 transitioning to a lower power state.

The user engagement history can be communicated to the network notification service 730 using an API conforming to a representational state transfer (REST) architecture (e.g., a RESTful API). As specific examples, the user engagement history can be transmitted to the activity feed service 720 using a POST, PUT, or PATCH command to the network notification service 730. Each of these commands can include various data fields, such as fields for identifying a user (e.g., ID), a device, an affected activity stream (e.g., Activity ID), activity records (AR), and history records (HR). More or fewer fields are possible. The PUT command can be used to store a new activity stream for a given user and/or to replace an existing activity stream for a given user with the user engagement history. The POST command can be used to update an existing activity stream for a given user with additional user engagement history records. The PATCH command can be used to modify user engagement history of an existing activity stream for a given user, such as when an earlier history record is modified due to additional information being determined about the activity after a prior POST command.

The network notification service 730 can decode the command transmitted by the client device 710 and, at 702, can forward the decoded command to the activity stream processing service 740. For example, the network notification service 730 can generate an insert command for user engagement history that is to be added to a new or existing activity stream. As another example, the network notification service 730 can generate an update command when it is detected that stored user engagement history is to be modified (such as when the network notification service 730 received a PATCH command).

The activity stream processing service 740 can access the activity store 750 using the user identifier, a device identifier, and/or the activity identifier as a key so that records associated with the user, device, or activity stream can be read from the activity store 750. The user engagement history uploaded by the client device 710 can be processed in conjunction with any user engagement history stored at the activity store 750 so that the activity stream associated with the user can be updated and stored at time 703. For example, the received activity stream records from the client device 710 can be stored unchanged within the activity store 750. As another example, the received activity stream records from the client device 710 can be annotated and/or modified (such as when a backing service has provided additional information about the activity stream records) before being stored within the activity store 750. As another example, the received activity stream records from the client device 710 can be merged with records retrieved from the activity store 750 and then the merged records can be written back to the activity store 750.

After processing and storing the user engagement history uploaded from the client device 710, an acknowledgment can be returned to the client device 710 at time 704. In response to receiving the acknowledgment that the user engagement history was successfully uploaded, the client device 710 can set a marker indicating when the last user engagement history was sent successfully. Additional updates to the user engagement history can be sent incrementally from the marker. In this manner, bandwidth between the client device 710 and the activity feed service 720 can potentially be saved by sending partial activity streams as opposed to complete activity streams.

Figure 8:
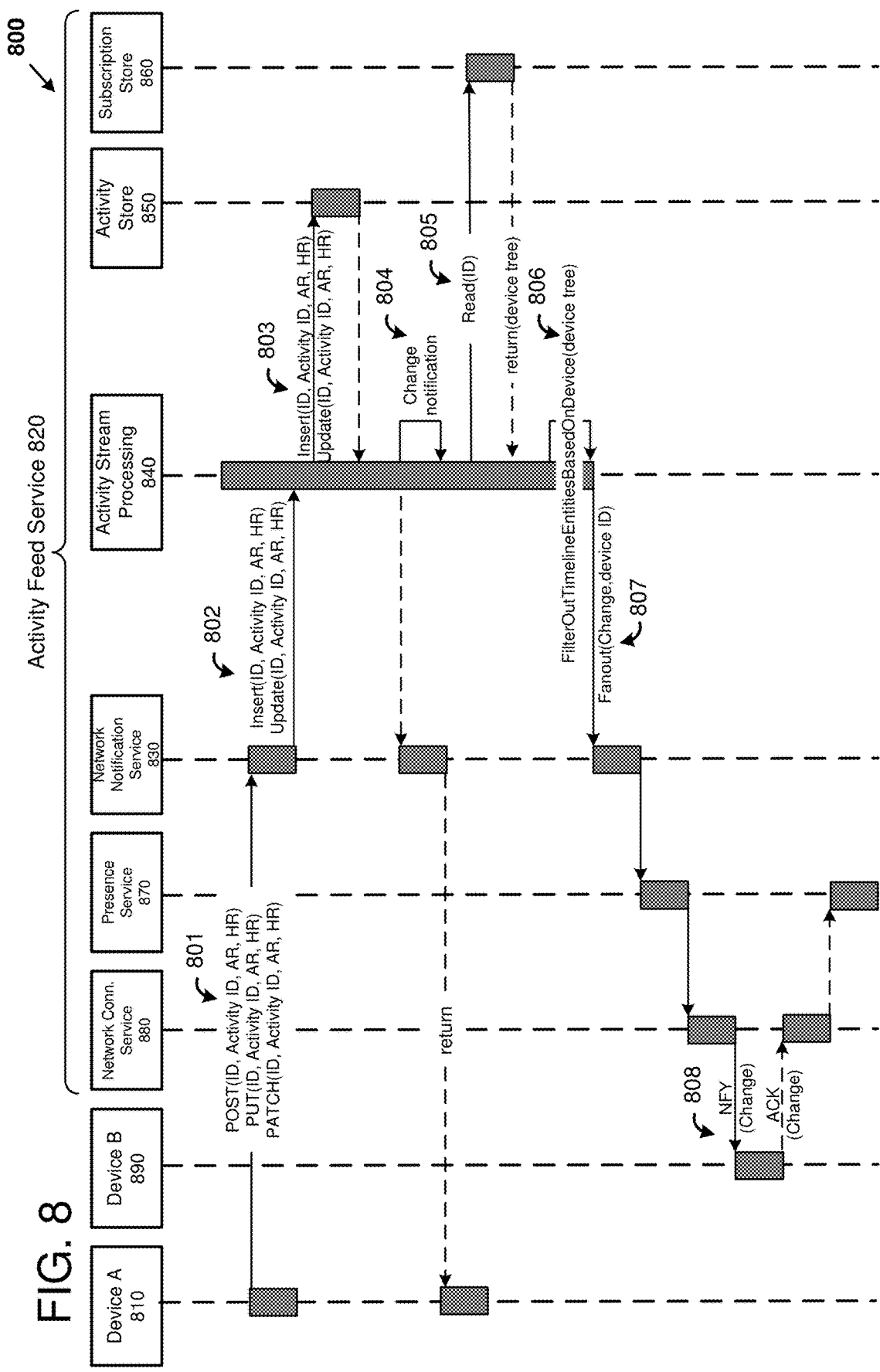
FIG. 8 shows a sequence diagram of an example method of notifying computing devices (e.g., activity feed clients) of a change in user engagement history.

FIG. 8 shows a sequence diagram of an example method 800 of using the activity feed service 820 to notify a computing device (Device B) 890 of a change in user engagement history in response to an update of the user engagement history by a computing device (Device A) 810. The devices 810 and 890 can both be associated with a particular user. For example, the device 810 can be a user's home computer and a device 890 can be the user's work computer. The activity feed service 820 can include a number of services acting in cooperation with each other. As one example, the activity feed service 820 can include a network notification service 830, an activity stream processing service 840, an activity store service 850, a subscription store 860, a presence service 870, and a network connection service 880.

At 801, the device 810 can notify the activity feed service 820 of a change in user engagement history. Specifically, the device 810 can send a POST, PUT, or PATCH command to the network notification service 830. The network notification service 830 can process the command and identify that it is targeted to the activity stream processing service 840. Specifically, at 802, the network notification service 830 can send and insert or update command to the activity stream processing service 840. The activity stream processing service 840 can identify the user associated with the user engagement history, process the user engagement history, and update the stored user engagement history. Specifically, at 803, the activity stream processing service 840 can issue and insert or update command to the activity store 850. The activity stream processing service 840 can acknowledge that the command from the device 810 was processed by sending an acknowledge back to the device 810. Additionally, at 804, the activity stream processing service 840 can determine whether additions or changes were made to the user engagement history. If additions or changes were made, at 805, the activity stream processing service 840 can retrieve a device tree associated with the user. The device tree can be stored in a subscription store service 860. The device tree can include information about all of the devices associated with the user.

At 806, the device tree can be processed based on the update to the user engagement history. As one example, the type of the activities updated and the user engagement history and the types and/or characteristics of the devices can be used to determine whether the device is in the device tree are updated with the changes to the user engagement history. For example, the user engagement history can be represented as one or more timeline entities that can be displayed within a timeline associated with the user. Some of the timeline entities can be filtered out before sending the user engagement history to a particular device so that the filtered timeline entities are not displayed on a particular device. As a specific example, some activities can be strictly work-related and so the work related activities can be filtered from home devices. As another example, some activities can be strictly non-work-related and so the non-work-related can be filtered from work devices. As another example, some activities can be associated with the applications that are not compatible with a particular device and those activities can be filtered before sending the user engagement history to that device. As another example, some activities can be associated with the applications that are not installed on a particular device. In one embodiment, the activities associated with uninstalled applications can be filtered before sending the activities to the particular device. In another embodiment, the activities associated with uninstalled applications can be augmented with information for installing a build of the application on the particular device.

The activity stream processing service 840 can determine differences in user engagement histories that are stored within the activity feed service 820 and user engagement histories that are stored on local devices. At 807, the activity stream processing service 840 can issue one or more commands to the network notification service 830 to update the local devices with changes in the user engagement histories. Specifically, the activity stream processing service 840 can identify the specific records that have changed in the user engagement history for each device, and an incremental update can be fanned out or sent to each device so that all devices can potentially be updated with the latest and most accurate user engagement history across all of the devices.

The network notification service 830 can utilize additional services to determine which devices can receive changes to the user engagement history. For example, a presence service 870 can be used to determine which devices are active (e.g., which devices are connected to the network). As one example, the devices can send a ping to the present service 870 periodically to indicate that the devices are connected to the network. As another example, the presence service 870 can snoop traffic coming from the devices to the activity feed service 820, and the presence service 870 can record the devices as being present for a specified time period since the last recorded traffic from the device. By tracking which devices are present, the activity feed service 820 can potentially reduce the bandwidth and/or increase the utilization of the bandwidth used by the activity feed service 820. For example, if user engagement histories are sent to a device that is not present (e.g., the device is powered down or the device is not connected to the network), bandwidth can be consumed even though the user engagement history will not be delivered to the device. The presence service 870 can communicate with the network connection service 880 which can maintain a network address for each of the devices of the device tree. At 808, the changes to the user engagement history can be sent to the device 890 using the address provided by the network connection service 880. The device 890 can acknowledge that the changes to the user engagement history were received by sending an acknowledgment back to the network connection service 880. The network connection service 880 can send a message to the presence service 870 indicating that the device 890 is active and connected to the network.

Figure 9:
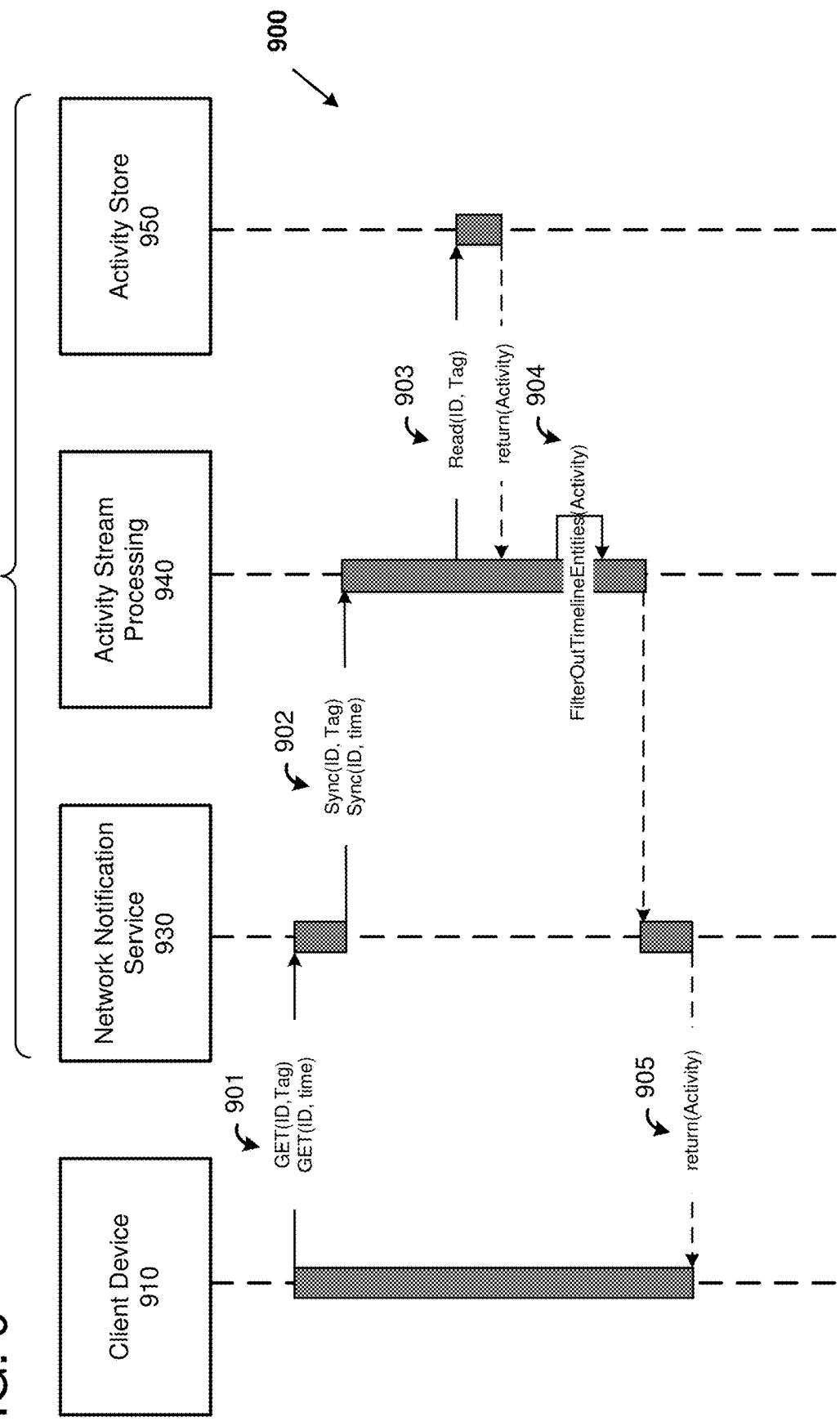
FIG. 9 shows a sequence diagram of an example method of synchronizing a computing device (e.g., an activity feed client) with user engagement history stored at an activity feed server or service.

FIG. 9 shows a sequence diagram of an example method 900 of using an activity feed service 920 to synchronize a client device 910 with user engagement history stored at the activity feed service 920. For example, the client device 910 can be synchronized when the client device 910 transitions from a lower power state to a higher power state (e.g., such as when the device powers on or resumes after a sleep mode). As another example, the client device 910 can be synchronized when the client device 910 is registered to the user by the activity feed service 920. As a specific example, the client device 910 can be a new device purchased by or assigned to the user, or the client device 910 can have a newly installed operating system or application that subscribes to the activity feed service 920.

At 901, the client device 910 can transmit a GET command to the network notification service 930. The GET command can include fields to specify aspects or characteristics of the user engagement history to be downloaded. Specifically, an identifier field can be used to identify the user and/or the device. A tag field can specify a characteristic of the device, such as a platform or use type (e.g., home or work). A time field can specify a time the device was last updated or a time period for which user engagement history as requested. More or fewer fields are possible to specify additional various aspects of the user engagement history requested.

At 902, the network notification service 930 can process the GET command and forward the command as a synchronization (Sync) command to the activity stream processing service 940. The activity stream processing service 940 can process the synchronization command to identify activity streams associated with the user engagement history. Specifically, at 903, the activity stream processing service 940 can request user engagement records from the activity store 950. The records returned from the activity store 950 can include all of the user engagement history corresponding to the properties specified in the GET command. At 904, the activity stream processing service 940 can perform additional processing based on characteristics of the client device 910 and the returned records. As a specific example, activities associated with unsupported applications of the device 910 can be filtered or removed from the activity records. At 905, the processed records can be returned to the client device 910 via the network notification service 930. In this manner, a new device or a recently resumed device can be updated with the user engagement history of the user so that the user can list or resume activities that were started on another device.

Figure 10:
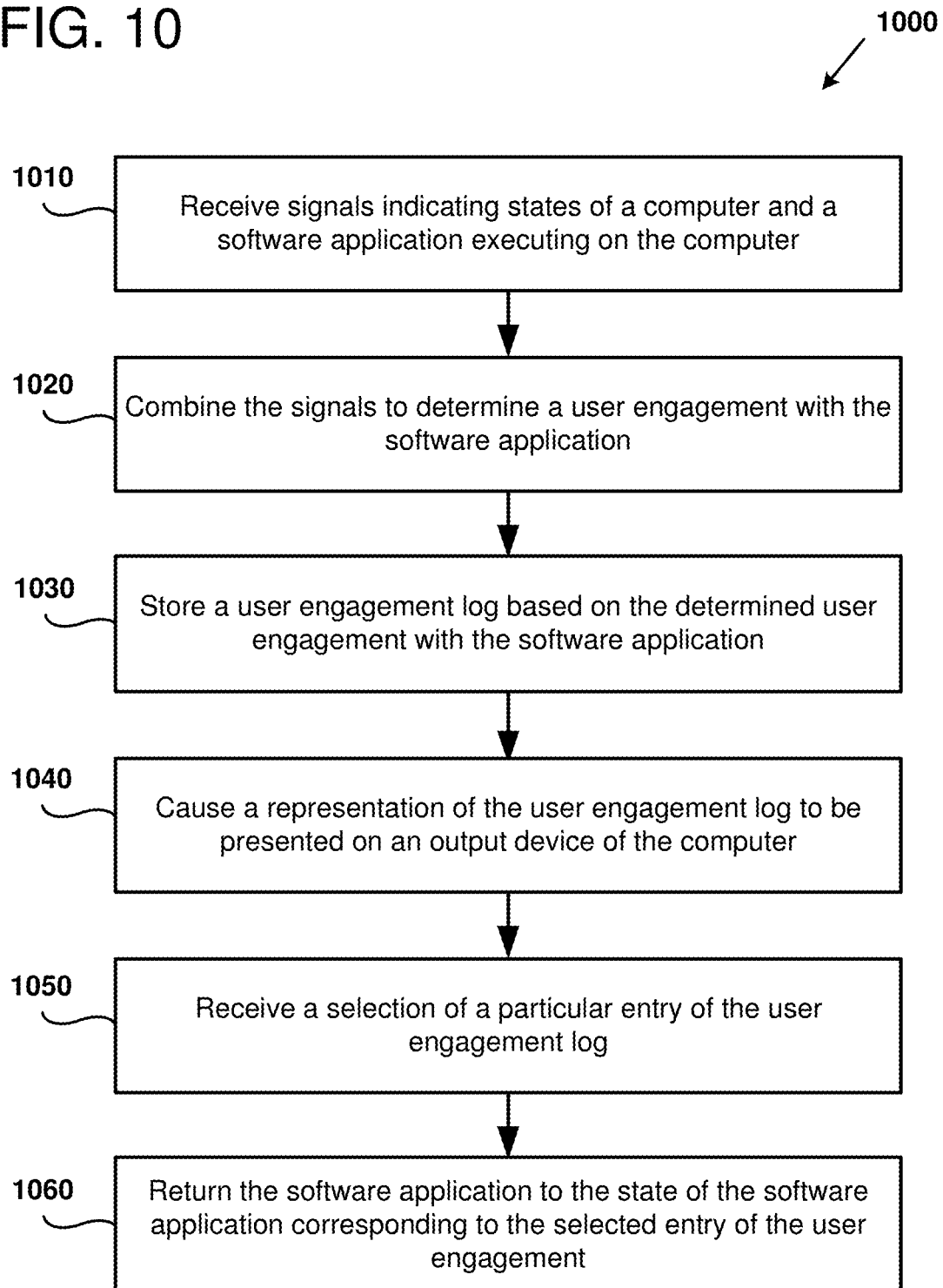
FIG. 10 illustrates a flow diagram of an example method of determining a user engagement with one or more software applications.

FIG. 10 illustrates a flow diagram of an example method 1000 of determining a user engagement with a software application executing on a computer. At 1010, signals indicating states of a computer and a software application can be received. For example, the signals indicating states of the computer can include signals indicating: an application in a focus of the operating system, an activity of a user input device, a position of a window displaying an output of an application, a state of a window displaying an output of an application, a cursor position, or a detected eye position. The signals indicating the state of the software application can include signals indicating: an activity type, a state of video playback, a state of audio playback, and landmark events such as saving a document, printing a document, editing a document, and so forth.

At 1020, the received signals can be combined to determine a user engagement with the software application. The signals can be combined in a variety of ways, such as by using machine learning techniques, a heuristic, or other rules-based algorithm. For example, the user engagement can be based on a type of the software application, a characteristic of the computer executing software application, and actions detected by the operating system. Patterns of the signals can be analyzed than compared to a user mental model. The user mental model can model the activity of a user using a set of rules or heuristics. As a specific example, the user mental model can indicate that a foreground application (such as the word processing application) is generally active when a user input device signal is not idle. The user mental model can indicate that a background application (such as a music player application) can be active when the application is generating an output even when the user input device signal is idle.

At 1030, a user engagement log can be stored based on the determined user engagement with the software application. The user engagement log can include an activity stream data structure that references activity records, task records, and history records. The user engagement log can be stored locally on the computer executing the application and/or remotely, such as at an activity feed service. The user engagement log can be stored in response to a landmark event occurring within an application, a command from a shell of the operating system, a request from an application service or an activity feed service, a specified time period expiring, or other various conditions. The user engagement log can include multiple records corresponding to different points in time and/or to different events occurring within the application so that the user's engagement with the software application can be represented over a period of time. In other words, the user engagement log can include a history of events corresponding to the user's engagement with the software application over a period of time.

At 1040, a representation of the user engagement log can be rendered for presentation on an output device of the computer. As one example, the records of the user engagement log can be presented in a timeline view. As another example, a list of records from the user engagement log and corresponding to a search key can be presented as a list.

At 1050, a user can select a particular record of the engagement log. The particular record of the engagement log can include a token for returning the software application to a state represented by the token.

At 1060, the software application can be returned to the state of the software application corresponding to the selected record of the engagement log. For example, the software application can be launched using the token as an argument for the launch command.

Figure 11:
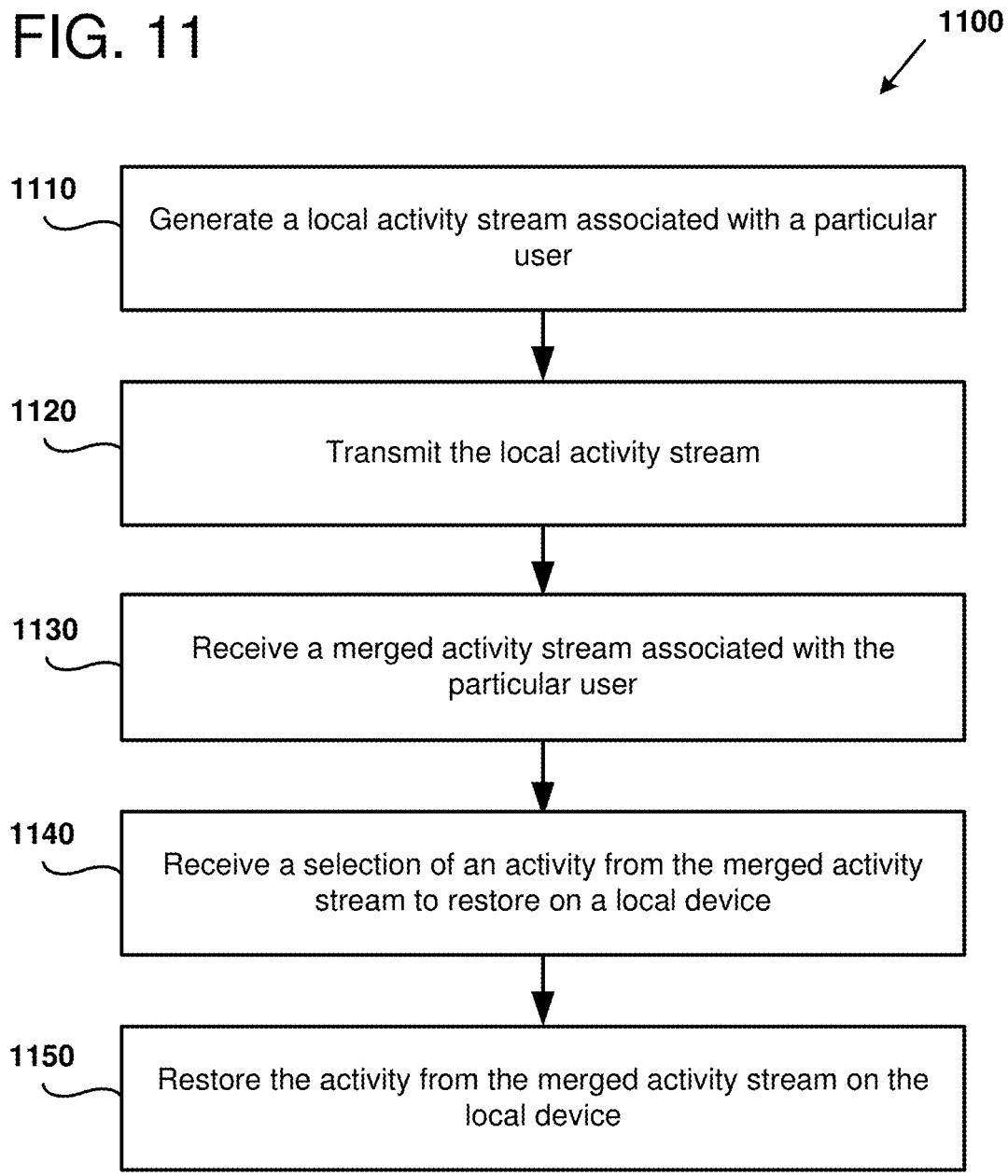
FIG. 11 illustrates a flow diagram of an example method of an activity feed client device in communication with an activity feed service.

FIG. 11 illustrates a flow diagram of an example method 1100 of an activity feed client device in communication with an activity feed service. At 1110, a local activity stream associated with the particular user can be generated. For example, the method 1000 can be used to generate the local activity stream.

At 1120, the local activity stream can be transmitted. For example, the local activity stream can be transmitted to the activity feed service. The local activity stream can be transmitted in response to various conditions. For example, the local activity stream can be transmitted in response to a landmark event occurring within an application, a command from a shell of the operating system, a request from an application service or an activity feed service, a specified time period expiring, or other various conditions. Thus, the local activity stream can be condensed at the local device prior to uploading the local activity stream to the activity feed service. By condensing the local activity stream, a privacy of the user can potentially be increased, and power and bandwidth can potentially be saved by using fewer transmissions to the activity feed service. The entire activity stream can be transmitted to the activity feed service or a portion of the activity stream can be transmitted to the activity feed service, such as by using a PUT, POST, or PATCH command.

At 1130, a merged activity stream associated with the particular user can be received. For example, the merged activity stream can include activities performed by the users across multiple devices and platforms. Thus, using the operating system shell or an activity feed application, the user of the local device can view activities that were performed on other devices. The activities from the merged activity stream can be displayed by the operating system shell of the activity feed application in a timeline view or in a search result requested by the user.

At 1140, a selection of an activity from the merged activity stream can be received. For example, the user can click on an activity displayed in the timeline view or in the search results, as described above.

At 1150, the selected activity from the merged activity stream can be restored on the local device. An activity is the pairing of an application and content. A record of the selected activity can include a token for restoring the activity, and the token can be used when launching the application associated with the activity. The application can be launched in a number of various ways. For example, the selected activity can be an activity that was recorded on the local device and so the recorded application and the launched application can be the same. As another example, the selected activity can be an activity that was recorded on a different device and so the recorded application can have differences with the launched application. Specifically, the launched application can be a build of the application for a different platform than the recorded application or the launched application can be a different version of the application for the same platform. Additionally, the local device may not be installed with the application when the activity is selected. However, the activity record can include information for installing the application on the local device. Thus, a selection of the activity can cause the operating system or activity feed application to install the selected application and to restore the state from the activity on the newly installed application. In other words, selecting an activity performed on a different device can cause the local device to re-hydrate the activity by installing a new application on the local device and restoring the state recorded for the activity.

Figure 12:
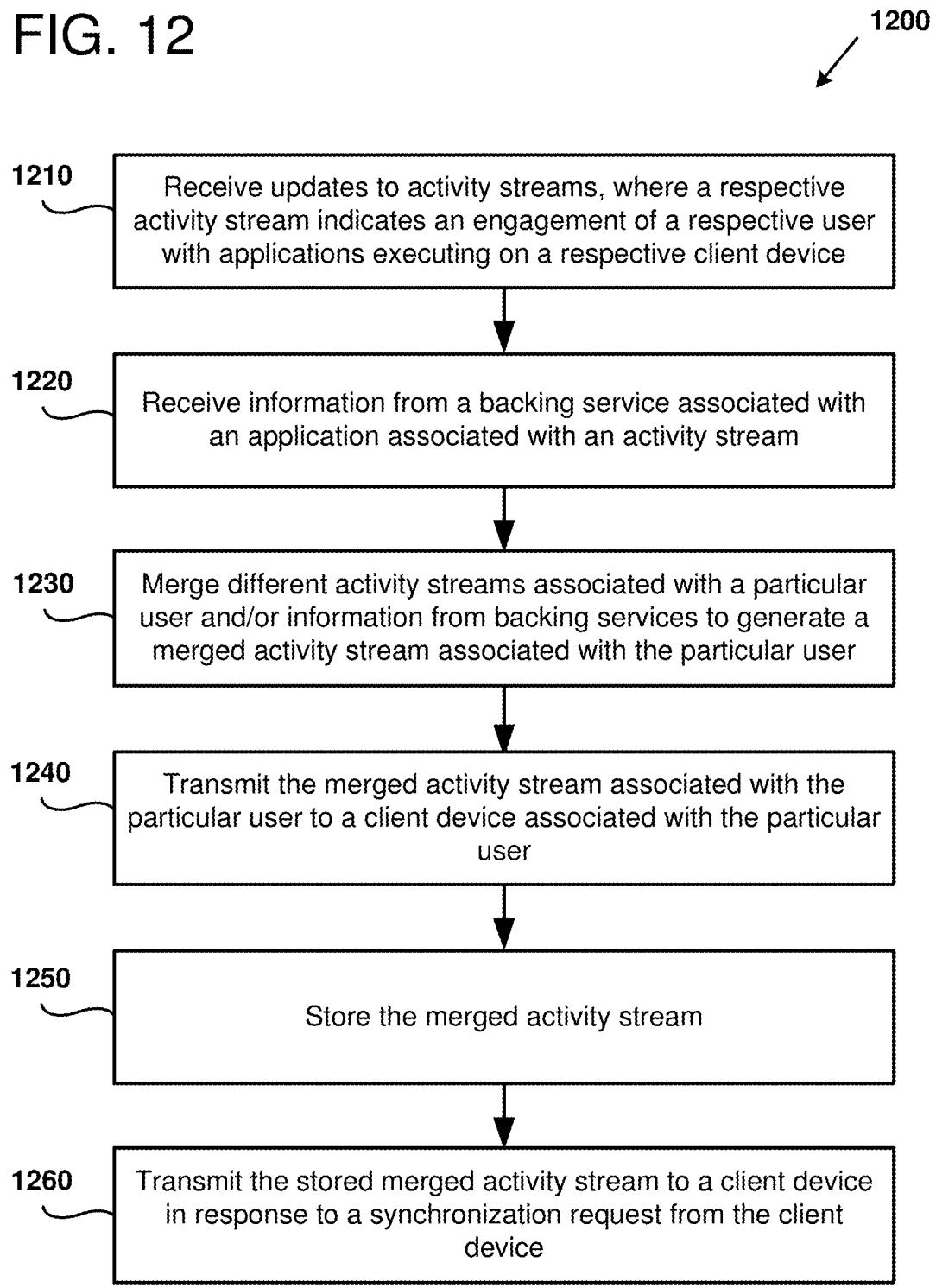
FIG. 12 illustrates a flow diagram of an example method of an activity feed service in communication with one or more activity feed client devices.

FIG. 12 illustrates a flow diagram of an example method 1200 of an activity feed service in communication with one or more activity feed client devices. At 1210, updates to activity streams can be received. A respective activity stream can indicate an engagement of a respective user with applications executing on a respective client device. Thus, a group of activity streams can indicate the user engaging with applications on different devices.

At 1220, information from a backing service associated with an application can be received. The information from the backing service can be associated with an activity stream. For example, the information can augment information about the activity that is not available to the application executing on the local device or to an operating system of the local device.

At 1230, different activity streams can be merged. The different activity streams can be associated with the particular user so that a merged activity stream can include activities performed by the user over multiple devices. Additionally, the merged activity stream can be annotated with information from the backing service. The different activity streams can include records for the same activity. The merged activity stream merge the records from the different activity streams into a single record. Thus, an activity performed over multiple devices can be represented by a single record in the merged activity stream. As a specific example, the user can be reading an article on a webpage on his or her mobile device while commuting into work. The user can arrive at work before finishing the article. The user can finish the article on a work computer. In this example, the mobile device can store an activity record for when the article was read on the mobile device, and the work computer can store an activity record for when the article was read on the work computer. However, the merged activity stream can combine the record from the mobile device and the record from the work computer into a single record encompassing the activity performed across the two different devices. Additionally or alternatively, a single activity record can indicate a merged activity across devices, and the single activity record can have separate history records recording engagement happening on the different respective devices. Thus, the activities can be merged while the history records of the individual devices are retained.

At 1240, the merged activity stream associated with the particular user can be transmitted to a client device associated with the user. The merged activity stream can be transmitted in response to a variety of conditions. For example, the merged activity stream can be transmitted in response to synchronization request such as when the client device powers on. As another example, the merged activity stream can be transmitted to a first device in response to an activity of the merged activity stream being updated by a second device.

At 1250, the merged activity stream can be stored. For example, the merged activity stream can be stored on the local device. As another example, the merged activity stream can be stored at the activity feed service.

At 1260, the stored merged activity stream can be transmitted to a client device in response to a synchronization request from the client device. For example, the client device can issue a synchronization request when the device is newly registered as a subscription service of the activity feed service or when the device comes online after being disconnected from the network.

Additional Examples of the Disclosed Technology

Additional examples of the disclosed subject matter are discussed herein in accordance with the examples discussed above.

In one embodiment, a method includes receiving a first signal indicating a state of an operating system executing on a computing device. The first signal indicating the state of the operating system can be selected from one or more of signals indicating: an application in a focus of the operating system, an activity of a user input device, a position of a window displaying an output of an application, a state of a window displaying an output of an application, a cursor position, or a detected eye position. The first signal can be a processed signal, and the processing can be based on a user mental model. The method includes receiving a second signal indicating a state of a software application executing on the operating system. The second signal indicating the state of the software application can be selected from one or more of signals indicating: an activity type, a state of video-playback, a state of audio-playback, a save event, a print event, or an edit event. The method includes determining a user engagement with the software application based on the first signal and the second signal. For example, determining the user engagement with the software application based on the first signal and the second signal can include comparing a pattern of the first signal and the second signal to a user mental model. Determining the user engagement with the software application can be further based on a type of the software application and types of other software applications executing on the operating system. Additionally, determining the user engagement with the software application can include assigning a weight to the second signal based on a history of the second signal. The method includes storing a user engagement log based on the determined user engagement and the state of the software application. The user engagement log includes a plurality of records representing the user's engagement with the software application over a period of time. A respective record can include a token for returning the software application to the state of the software application represented by the token. The token for returning the software application to the state of the software application represented by the token can be selected from one or more of: a URL, a document name, or a location within a document. The software application can be backed by a network-accessible service, and the network-accessible service can provide a third signal for determining the user engagement with the software application.

The method can further include causing a representation of the user engagement log to be presented on an output device of the computing device. A selection of a record of the user engagement log can be received. The software application can be returned to the state of the software application corresponding to the selected record of the user engagement log.

In another embodiment, one or more computer-readable media storing computer-executable instructions, which when executed by a computer, cause the computer to perform operations. The operations comprise receiving a plurality of signals indicating states of the computer and a software application executing on the computer. The operations comprise combining the signals to determine a user engagement with the software application. Combining the signals to determine the user engagement with the software application can include matching the signals to a user mental model. Additionally or alternatively, at least one signal of the plurality of signals can be smoothed by classifying the at least one signal as a state of a user mental model. The software application can be in communication with a remote service, and combining the signals to determine the user engagement with the software application can include using information received from the remote service. The operations comprise storing a user engagement log based on a history of the determined user engagement with the software application. The user engagement log can include a plurality of records, and a respective record can include a parameter for returning the software application to a recorded state of the software application. The operations can further comprise receiving a selection of a particular record of the user engagement log; and returning the software application to the state of the software application corresponding to the selected record of the user engagement log by launching the software application using the parameter for returning the software application to the recorded state of the software application.

In another embodiment, a computing system comprises a processor, a listener module, a software application, and an arbiter module. The listener module is configured to execute on the processor and to generate a signal based on a state of the computing system. The software application is configured to execute on the processor and to generate a signal based on a state of the software application. The arbiter module is configured to execute on the processor and to combine the signal based on the state of the computing system and the signal based on the state of the software application to determine a user engagement with the software application. The arbiter module is configured to publish a history of the user engagement with the software application. The published history of the user engagement with the software application can include a plurality of records, and a respective record can include a parameter for returning the software application to a particular state corresponding to when the respective record was created. The history of the user engagement can be published to a remote service.

In another embodiment, a method comprises receiving a first activity stream associated with a particular user. The first activity stream indicates engagement of the user with a first application executing on a first platform. The method comprises receiving a second activity stream associated with the particular user. The second activity stream indicates engagement of the user with a second application executing on a second platform. The method comprises merging the first activity stream and the second activity stream to generate a merged activity stream associated with the particular user. The method comprises transmitting the merged activity stream associated with the particular user to the first platform. The merged activity stream can be transmitted to the first platform in response to receiving an update to the second activity stream. The merged activity stream can be transmitted to all devices identified in a device graph associated with the particular user.

Merging the first activity stream and the second activity stream can include identifying a common activity in the first activity stream and the second activity stream, and combining a first record from the first activity stream corresponding to the common activity and a second record from the second activity stream corresponding to the common activity into a third record of the merged activity stream.

The method can further comprise storing the merged activity stream, and transmitting the merged activity stream to a third platform in response to a synchronization request from the third platform. The method can further comprise receiving information related to the engagement of the particular user with the first application from a backing service associated with the first application. The received information can be used to augment the merged activity stream before transmitting the merged activity stream to the first platform. The method can further comprise determining an applicability of activities of the second activity stream with regards to the first platform. For example, merging the first activity stream and the second activity stream can include removing activities from the second activity stream that are not applicable to the first platform. The applicability of the activities of the second activity stream with regards to the first platform can be based on a first location associated with the first platform and locations associated with respective activities of the second activity stream. The applicability of the activities of the second activity stream with regards to the first platform can be based on whether a build of the second application is available for the first platform.

In another embodiment, a method comprises transmitting a local activity stream associated with a particular user, where the local activity stream indicates engagement of the user with a first application executing on a first platform. The local activity stream can be transmitted in response to updating a record of the local activity stream based on engagement of the user with the first application. The method comprises receiving a merged activity stream associated with the particular user, where the merged activity stream indicates engagement of the user with a second application executing on a second platform and the first application executing on the first platform. As one example, the merged activity stream can be received in response to the first platform transitioning from a lower power state to a higher power state. As another example, the merged activity stream can be received in response to the particular user engaging with the second application executing on the second platform. The method can further comprise receiving a selection of an activity from the merged activity stream to restore on the first platform, and restoring the activity from the merged activity stream on the first platform. The selected activity from the merged activity stream can correspond to the second application executing on the second platform, and restoring the selected activity on the first platform can include executing a build of the second application targeted to the first platform. Restoring the selected activity on the first platform can include installing the build of the second application targeted to the first platform on the first platform. The method can further comprise generating the local activity stream, and generating the local activity stream can include condensing local activities associated with the particular user before transmitting the local activity stream.

In another embodiment, an activity feed server computer comprises a network interface configured to communicate over a network and a processor in communication with the network interface. The processor is configured to receive updates to activity streams from the network interface, where a respective activity stream indicates an engagement of a respective user with applications executing on a respective client device connected to the network. The processor is configured to merge different activity streams associated with a particular user to generate a merged activity stream associated with the particular user. The different received activity streams correspond to different respective client devices. Merging the different activity streams can include identifying a common activity among the different activity streams, and combining records from the different activity streams corresponding to the common activity into a merged record of the merged activity stream. The processor is configured to transmit the merged activity stream associated with the particular user to the network interface for communication over the network. The merged activity stream can be transmitted to a first client device associated with the particular user in response to an update to an activity stream associated with a different client device associated with the particular user.

Example Computing Environment

Figure 13:
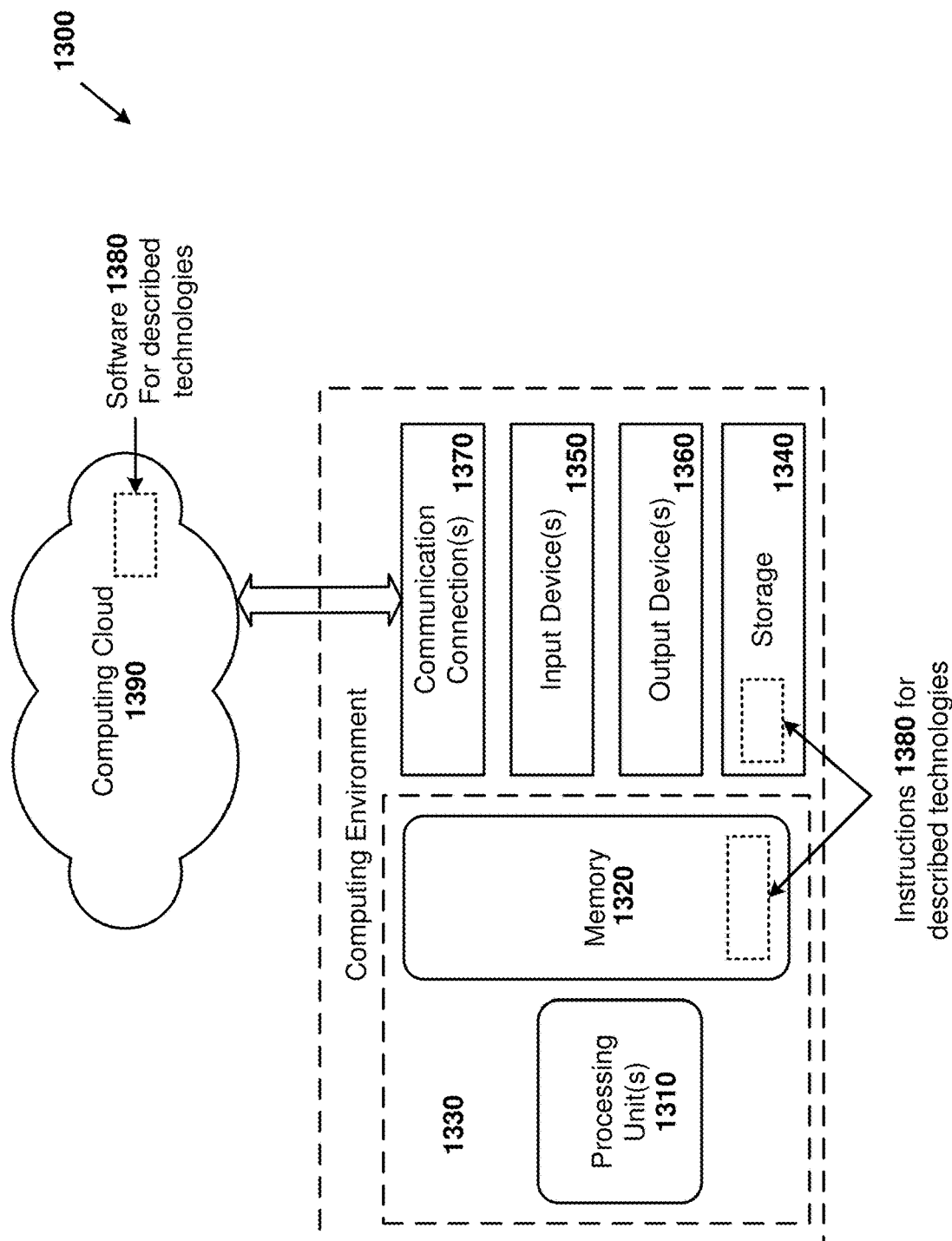
FIG. 13 is a block diagram illustrating a suitable computing environment for implementing some embodiments of the disclosed technology.

FIG. 13 illustrates a generalized example of a suitable computing environment 1300 in which described embodiments, techniques, and technologies, including supporting a multi-language playback framework, can be implemented.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one processing unit 1310 and memory 1320. In FIG. 13, this most basic configuration 1330 is included within a dashed line. The processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, the disclosed methods can be executed on processing units 1310 located in the computing environment 1330, or the disclosed methods can be executed on servers located in the computing cloud 1390.

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. A method comprising:
receiving a first signal indicating a state of an operating system executing on a computing device;
receiving a second signal indicating a state of a software application executing on the operating system;
determining a user engagement with the software application based on the first signal and the second signal; and
storing a user engagement log based on the determined user engagement and the state of the software application, the user engagement log comprising a plurality of records representing the user's engagement with the software application over a period of time,
wherein a respective record of the user engagement log includes a token for returning the software application to an earlier state of the software application represented by the token, wherein the token is selected from one or more of a URL, a document name, a location within a document, or a time stamp within a video or audio track.

2. The method of claim 1, wherein determining the user engagement with the software application based on the first signal and the second signal comprises comparing a pattern of the first signal and the second signal to a user mental model.

3. The method of claim 1, wherein determining the user engagement with the software application is further based on a type of the software application and types of other software applications executing on the operating system.

4. The method of claim 1, wherein determining the user engagement with the software application comprises assigning a weight to the second signal based on a history of the second signal.

5. The method of claim 1, further comprising:
causing a representation of the user engagement log to be presented on an output device of the computing device;
receiving a selection of the respective record of the user engagement log; and returning the software application to the earlier state of the software application corresponding to the respective record of the user engagement log.

6. The method of claim 1, wherein the first signal indicating the state of the operating system is selected from one or more of signals indicating: an application in a focus of the operating system, an activity of a user input device, a position of a window displaying an output of an application, a state of a window displaying an output of an application, a cursor position, or a detected eye position.

7. The method of claim 1, wherein the second signal indicating the state of the software application is selected from one or more of signals indicating: an activity type, a state of video-playback, a state of audio-playback, a save event, a print event, or an edit event.

8. The method of claim 1, wherein the software application is backed by a network-accessible service, and the network-accessible service provides a third signal for determining the user engagement with the software application.

9. The method of claim 1, wherein the first signal is a processed signal, and the processing is based on a user mental model.

10. One or more computer-readable memory devices or storage devices storing computer-executable instructions, which when executed by a computer, cause the computer to perform operations, the operations comprising:
   receiving a plurality of signals indicating states of the computer and a software application executing on the computer;
   combining the signals to determine a user engagement with the software application; and
   storing a user engagement log based on a history of the determined user engagement with the software application,
   wherein the user engagement log comprises a plurality of records, and a respective record includes a parameter for returning the software application to an earlier state of the software application, the parameter comprising one or more of a URL, a document name, a location within a document, or a time stamp within a video or audio track.

11. The one or more computer-readable memory devices or storage devices of claim 10, the operations further comprising:
   receiving a selection of the respective record of the user engagement log; and
   returning the software application to the earlier state of the software application corresponding to the respective record of the user engagement log by launching the software application using the parameter for returning the software application to the earlier state of the software application.

12. The one or more computer-readable memory devices or storage devices of claim 10, wherein combining the signals to determine the user engagement with the software application comprises matching the signals to a user mental model.

13. The one or more computer-readable memory devices or storage devices of claim 10, wherein at least one signal of the plurality of signals is smoothed by classifying the at least one signal as a state of a user mental model.

14. The one or more computer-readable memory devices or storage devices of claim 10, wherein the software application is in communication with a remote service, and combining the signals to determine the user engagement with the software application comprises using information received from the remote service.

15. A computing system comprising:
   a processor;
   a listener module configured to execute on the processor and to generate a signal based on a state of the computing system;
   a software application configured to execute on the processor and to generate a signal based on a state of the software application; and
   an arbiter module configured to execute on the processor and to:
      combine the signal based on the state of the computing system and the signal based on the state of the software application to determine a user engagement with the software application; and
      publish a history of the user engagement with the software application,
      wherein the published history of the user engagement with the software application comprises a plurality of records, and a respective record includes a parameter for returning the software application to an earlier state corresponding to when the respective record was created, the parameter comprising one or more of a URL, a document name, a location within a document, or a time stamp within a video or audio track.

16. The computing system of claim 15, wherein the history of the user engagement is published to a remote service.

* * * * *